United States Patent
Sagawa et al.

(10) Patent No.: US 9,003,908 B2
(45) Date of Patent: Apr. 14, 2015

(54) WORKING VEHICLE

(71) Applicant: Iseki & Co., Ltd., Ehime-ken (JP)

(72) Inventors: Noboru Sagawa, Ehime-ken (JP);
Takashi Wakino, Ehime-ken (JP);
Fumiaki Nishikawa, Ehime-ken (JP);
Tatsuzo Murakami, Ehime-ken (JP);
Satoru Kinoshita, Ehime-ken (JP)

(73) Assignee: Iseki & Co., Ltd., Ehime-ken (JP)

( * ) Notice: Subject to any disclaimer, the term of this patent is extended or adjusted under 35 U.S.C. 154(b) by 0 days.

(21) Appl. No.: 14/024,455

(22) Filed: Sep. 11, 2013

(65) Prior Publication Data
US 2014/0076103 A1    Mar. 20, 2014

(30) Foreign Application Priority Data

Sep. 14, 2012    (JP) .................................. 2012-203381

(51) Int. Cl.
*F16H 61/32*    (2006.01)
*F16H 63/44*    (2006.01)
*B60K 17/08*    (2006.01)
*B60K 20/00*    (2006.01)
(Continued)

(52) U.S. Cl.
CPC ................. *B60K 17/08* (2013.01); *B60K 20/00* (2013.01); *F16H 3/093* (2013.01); *F16H 37/043* (2013.01); *F16H 2037/044* (2013.01); *F16H 2037/045* (2013.01)

(58) Field of Classification Search
USPC ............. 74/15.2, 15.4, 15.6, 15.66, 330, 331, 74/333, 335, 606 R, 665 F
See application file for complete search history.

(56) References Cited

U.S. PATENT DOCUMENTS 4,116,090 A * 9/1978 Zenker ............................ 74/745
4,208,923 A * 6/1980 Ikegami ....................... 74/15.63
(Continued)

FOREIGN PATENT DOCUMENTS

EP         0 696 695 A2    2/1996
JP        2000-351335 A   12/2000
(Continued)

OTHER PUBLICATIONS

New Zealand Office Action for the related New Zealand Application No. 615519 dated Sep. 20, 2013.
(Continued)

*Primary Examiner* — Troy Chambers
*Assistant Examiner* — Jude Agendia
(74) *Attorney, Agent, or Firm* — Kenealy Vaidya LLP

(57) ABSTRACT

According to one embodiment, a working vehicle includes: a main change speed mechanism configured to transmit a rotating power, generated by a power source; a first auxiliary change speed mechanism configured to transmit the rotating power, transmitted through the main change speed mechanism, to drive wheels; a second auxiliary change speed mechanism configured to transmit the rotating power to the drive wheels; a first lever configured to operate the first auxiliary change speed mechanism to perform a first auxiliary shift operation; and a second lever configured to operate the second auxiliary change speed mechanism to perform a second auxiliary shift operation, wherein: the first auxiliary change speed mechanism is activated when the second auxiliary change speed mechanism in a neutral state; and the second auxiliary change speed mechanism is activated when the first auxiliary change speed mechanism is in the neutral state.

8 Claims, 23 Drawing Sheets

(51) Int. Cl.
*F16H 3/093* (2006.01)
*F16H 37/04* (2006.01)

(56) References Cited

U.S. PATENT DOCUMENTS

| | | | | |
|---|---|---|---|---|
| 4,294,130 A | * | 10/1981 | Kisaka et al. | 74/15.4 |
| 4,653,342 A | * | 3/1987 | Ota et al. | 74/473.29 |
| 4,716,775 A | * | 1/1988 | Horii et al. | 74/15.86 |
| 4,824,128 A | * | 4/1989 | Takagi et al. | 180/53.1 |
| 5,293,956 A | * | 3/1994 | Onishi | 180/233 |
| 5,901,606 A | * | 5/1999 | Umemoto et al. | 74/15.66 |
| 5,937,697 A | * | 8/1999 | Matsufuji | 74/11 |
| 5,947,218 A | * | 9/1999 | Ishimaru | 180/53.1 |
| 6,003,391 A | * | 12/1999 | Kojima et al. | 74/15.66 |
| 6,044,720 A | * | 4/2000 | Matsufuji | 74/331 |
| 6,360,623 B1 | * | 3/2002 | Matsufuji | 74/15.66 |
| 6,446,521 B1 | * | 9/2002 | Hama et al. | 74/335 |
| 6,487,924 B2 | * | 12/2002 | Matsufuji et al. | 74/331 |
| 6,530,290 B2 | * | 3/2003 | Matsufuji et al. | 74/335 |
| 7,444,897 B2 | * | 11/2008 | Komine et al. | 74/473.1 |
| 8,096,200 B2 | * | 1/2012 | Yamaguchi | 74/15.4 |
| 8,181,547 B2 | * | 5/2012 | Tsuji et al. | 74/335 |
| 2001/0027690 A1 | * | 10/2001 | Matsufuji et al. | 74/335 |

FOREIGN PATENT DOCUMENTS

| | | |
|---|---|---|
| JP | 2001-130281 A | 5/2001 |
| JP | 2001-199253 A | 7/2001 |
| JP | 2005-297710 A | 10/2005 |
| JP | 2006-36144 A | 2/2006 |
| JP | 2008-95748 A | 4/2008 |
| JP | 2012-1146 A | 1/2012 |

OTHER PUBLICATIONS

The extended European Search Report for the related European Patent Application No. 13184269.2 dated Jan. 20, 2014.
Japanese Office Action for the related Japanese Patent Application No. 2012-203381 dated Aug. 26, 2014.
The Explanation for the related Japanese Patent Application No. 2012-203381 dated Aug. 7, 2014.

* cited by examiner

REAR SIDE ⟶ FRONT SIDE
FRONT-REAR DIRECTION

FRONT SIDE ⟵ REAR SIDE
FRONT-REAR DIRECTION

WORKING VEHICLE

BACKGROUND

1. Field of the Invention

The invention relates to a working vehicle.

2. Description of the Related Art

Regarding a working vehicle of the related art, for example, JP-A-2008-95748 discloses a transmission for a tractor in which power is transmitted from a power source to drive wheels with speed-changing. The transmission includes a main gearshift shaft, a pair of advancing and reversing hydraulic clutch mechanisms, two sets of gear synchronizing first and second change speed mechanisms and a pair of first and second hydraulic clutch mechanisms. In this transmission, the main gearshift shaft is arranged in parallel with an input shaft. The pair of advancing and reversing hydraulic clutch mechanisms is arranged on the input shaft and switches a rotating direction of power transmitted to the main gearshift shaft. The two sets of gear synchronizing first and second change speed mechanisms are arranged on output sides of the pair of advancing and reversing hydraulic clutch mechanisms. The pair of first and second hydraulic clutch mechanisms is arranged on an output side viewed from the two sets of first and second change speed mechanisms, and the pair of first and second hydraulic clutch mechanisms switches connection of power transmitted from each of the two sets of first and second change speed mechanisms.

By the above configuration, the transmission of the tractor disclosed in JP-A-2008-95748 schemes a main gearshift multistage with a simple configuration. However, a tractor having higher general versatility is required, so that there is a room for further improvement.

SUMMARY

An object of the invention is to provide a working vehicle capable of improving general versatility.

According to a first aspect of the invention, there is provided a working vehicle includes: a main change speed mechanism configured to transmit a rotating power, generated by a power source; a first auxiliary change speed mechanism configured to transmit the rotating power, transmitted through the main change speed mechanism, to drive wheels; a second auxiliary change speed mechanism configured to transmit the rotating power, transmitted through the main change speed mechanism, to the drive wheels; a first lever configured to operate the first auxiliary change speed mechanism to perform a first auxiliary shift operation; and a second lever configured to operate the second auxiliary change speed mechanism to perform a second auxiliary shift operation, wherein: the first auxiliary change speed mechanism is activated when the second auxiliary change speed mechanism in a neutral state; and the second auxiliary change speed mechanism is activated when the first auxiliary change speed mechanism is in the neutral state.

According to a second aspect of the invention, in the working vehicle of the first aspect, the first auxiliary change speed mechanism may include a first shifter configured to change a rotating speed to a high speed or a low speed; the second auxiliary change speed mechanism may include a second shifter configured to change the rotating speed to an extreme low speed; and the first shifter and the second shifter may be supported by a gearshift shaft.

According to a third aspect of the invention, the working vehicle of the first aspect may further include a transmission shaft configured to: transmit the rotating power when the rotating speed is changed to the low speed in the first auxiliary change speed mechanism; and transmit the rotating power from the main change speed mechanism to the second auxiliary change speed mechanism.

According to a fourth aspect of the invention, the working vehicle of the first aspect may further include: a regulating mechanism configured to: limit the second auxiliary shift operation to maintain the neutral state of the second auxiliary change speed mechanism when the rotating power is transmitted by the first auxiliary change speed mechanism; and limit the first auxiliary shift operation to maintain the neutral state of the first auxiliary change speed mechanism when the rotating power is transmitted by the second auxiliary change speed mechanism.

According to a fifth aspect of the invention, in the working vehicle of the first aspect, the second auxiliary change speed mechanism and the second lever may be detachably attached to the working vehicle.

According to a sixth aspect of the invention, the working vehicle of the first aspect may further include a regulating mechanism configured to: limit the second auxiliary shift operation when the rotating speed is changed by the first auxiliary change speed mechanism; and limit the first auxiliary shift operation when the rotating speed is changed by the second auxiliary change speed mechanism.

According to a seventh aspect of the invention, the working vehicle of the sixth or seventh aspect may further include: a switching mechanism configured to switch a generated power, generated by the power source, to rotation in advancing direction or reversing direction; and a high-low change speed mechanism configured to change a rotating speed corresponding to the generated power at a high speed stage or a low speed stage. Further, the main change speed mechanism may be configured to change the rotating speed at any one of a plurality of gearshift stages, and the auxiliary change speed mechanism may be configured to change the rotating speed corresponding to the rotating power that is transmitted through the switching mechanism, the high-low change speed mechanism and the main change speed mechanism.

According to a eighth aspect of the invention, in the working vehicle of the seventh aspect, each of the switching mechanism and the high-low change speed mechanism includes a hydraulic multiple disk clutch that is configured to switch a power transmission path; and the main change speed mechanism is a synchromesh change speed mechanism and is configured to change the rotating speed corresponding to the rotating power that is transmitted through the switching mechanism and the high-low change speed mechanism.

According to a ninth aspect of the invention, the working vehicle of the eighth or ninth aspect may further include: a high-low lever configured to perform a high-low gearshift operation of the high-low change speed mechanism while the working vehicle is moving; and a main lever configured to perform a main shift operation of the main change speed mechanism while the working vehicle is moving.

The working vehicle of the invention has an effect of improving general versatility.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION. OF THE INVENTION

Hereinafter, an illustrative embodiment of the invention will be specifically described with reference to the drawings. In the meantime, the invention is not limited to the illustrative embodiment. Also, the constitutional elements of the illustrative embodiment include elements that can be easily replaced by one skilled in the art or substantially equivalent elements.

Figure 1:
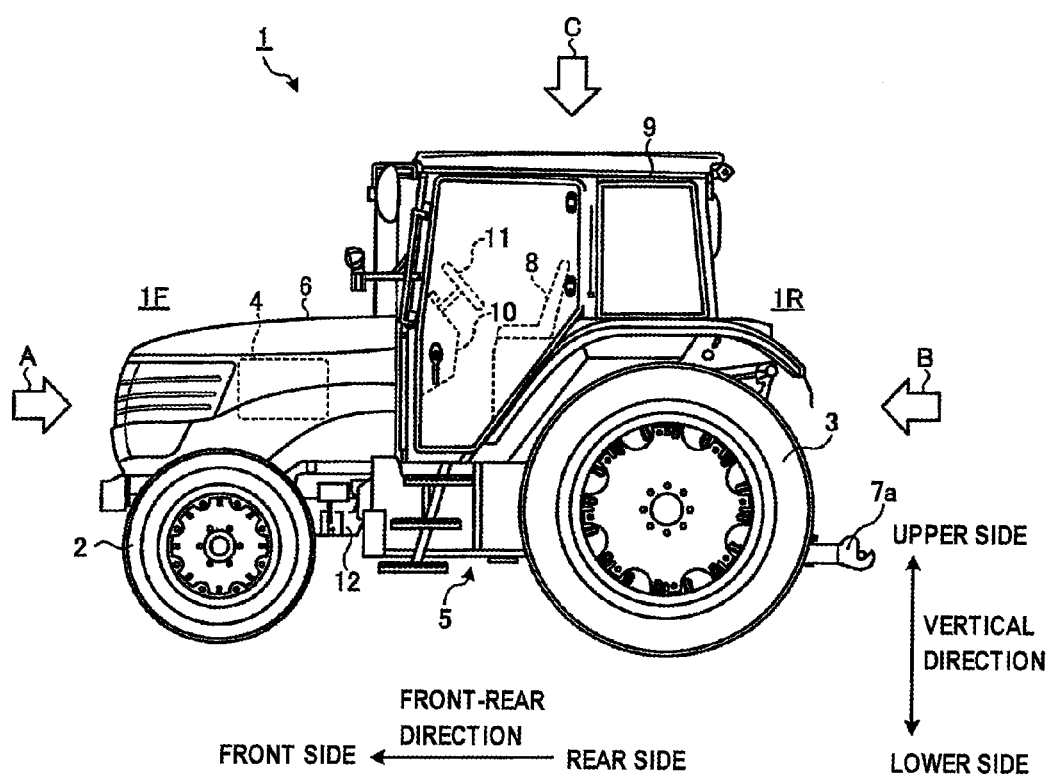
FIG. 1 is a schematic view of a tractor according to an illustrative embodiment.
Figure 2:
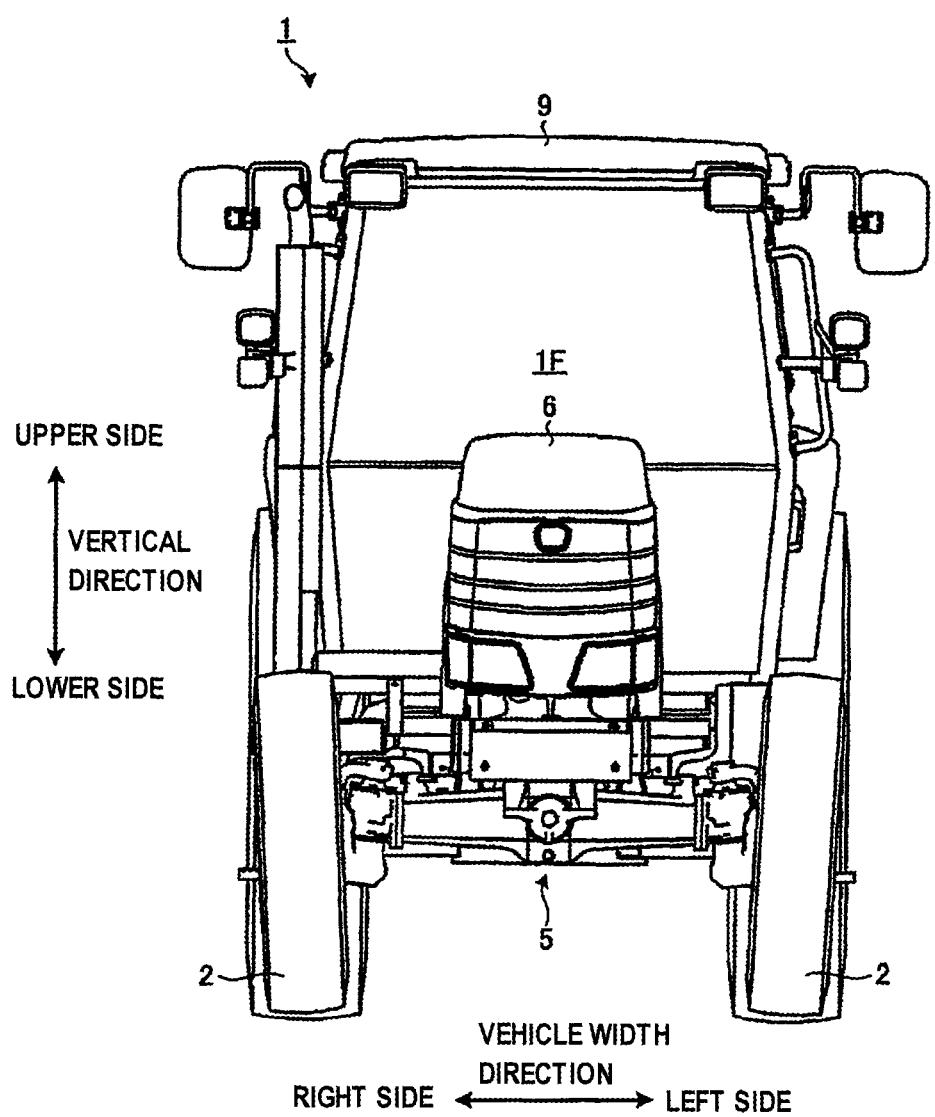
FIG. 2 is a view seen from an A arrow direction of FIG. 1 (a view showing a vehicle body front side part)
Figure 3:
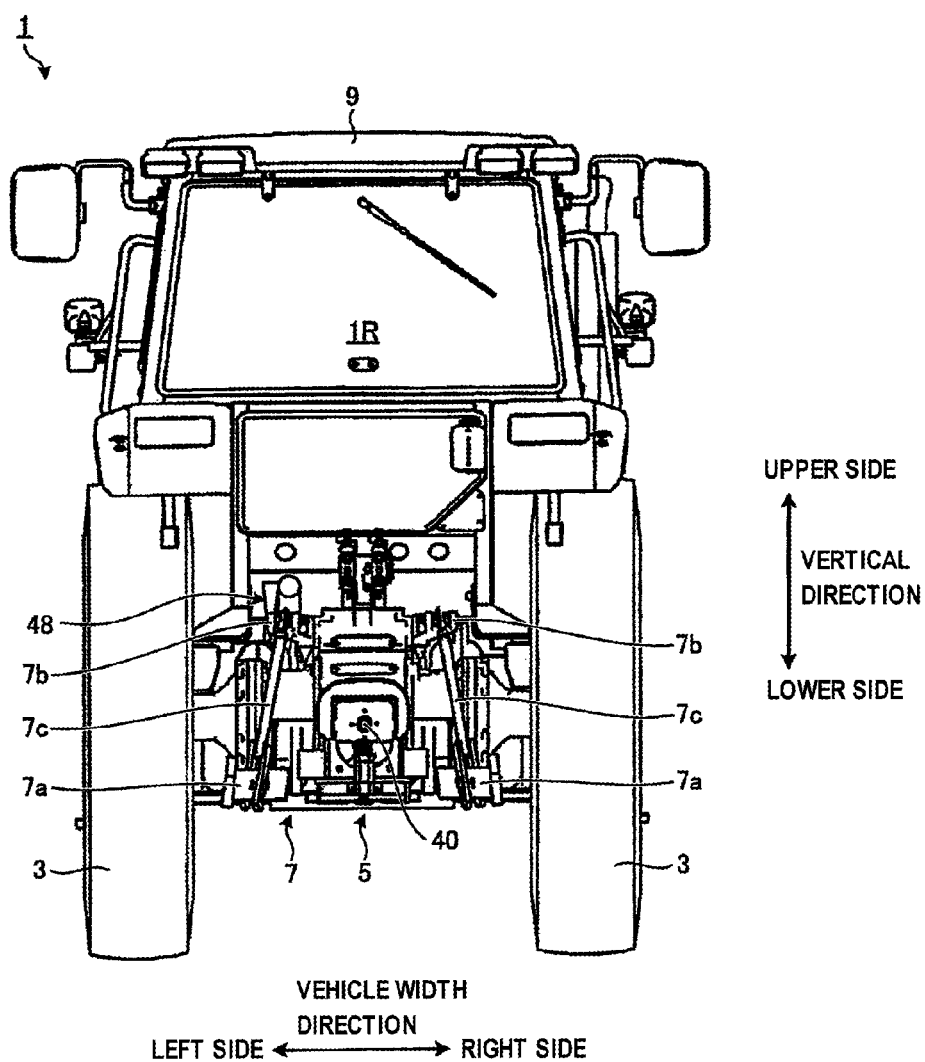
FIG. 3 is a view seen from a B arrow direction of FIG. 1 (a view showing a vehicle body rear side part)
Figure 4:
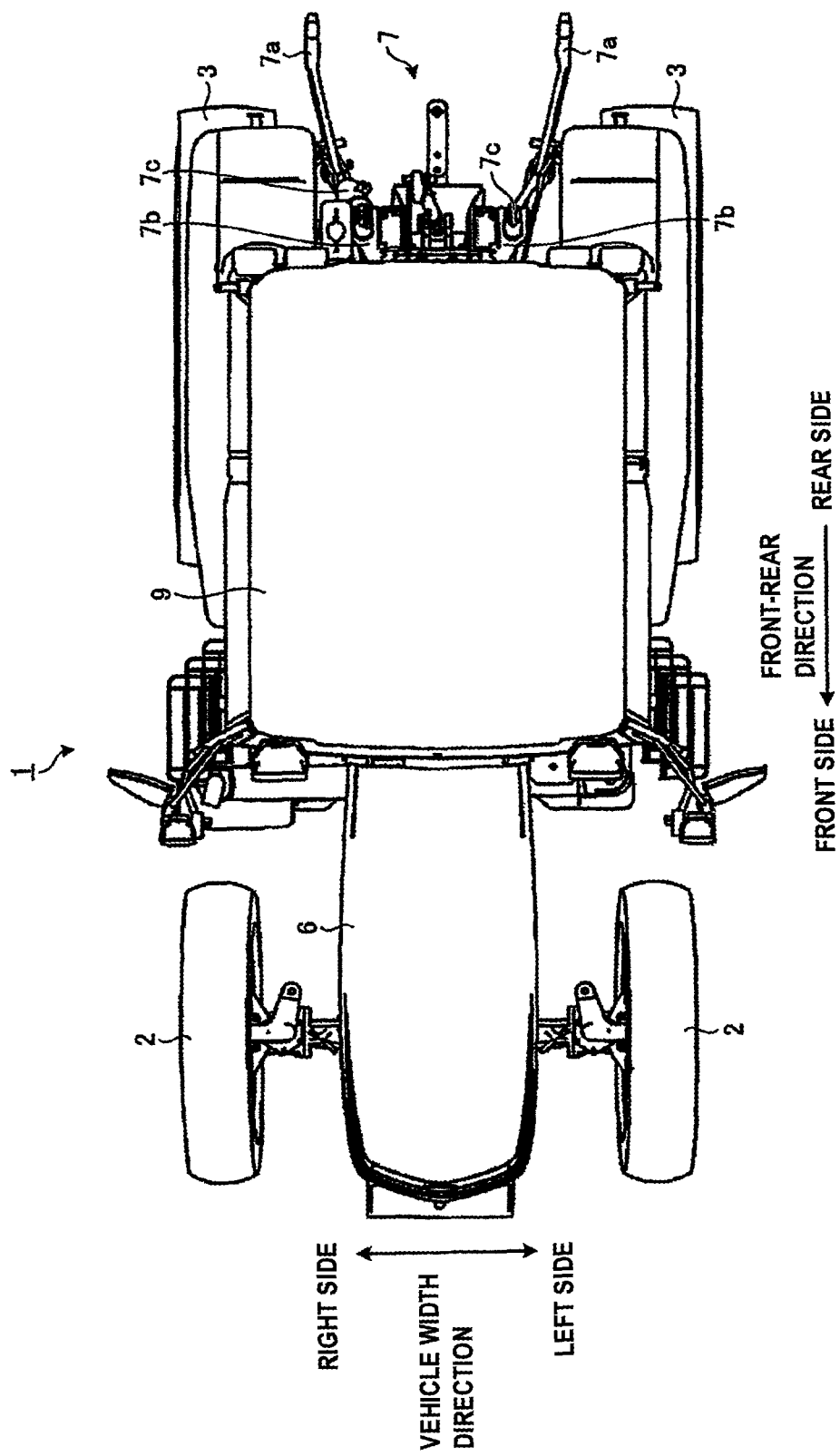
FIG. 4 is a view seen from a C arrow direction of FIG. 1 (a view showing a vehicle body upper part)
Figure 5:
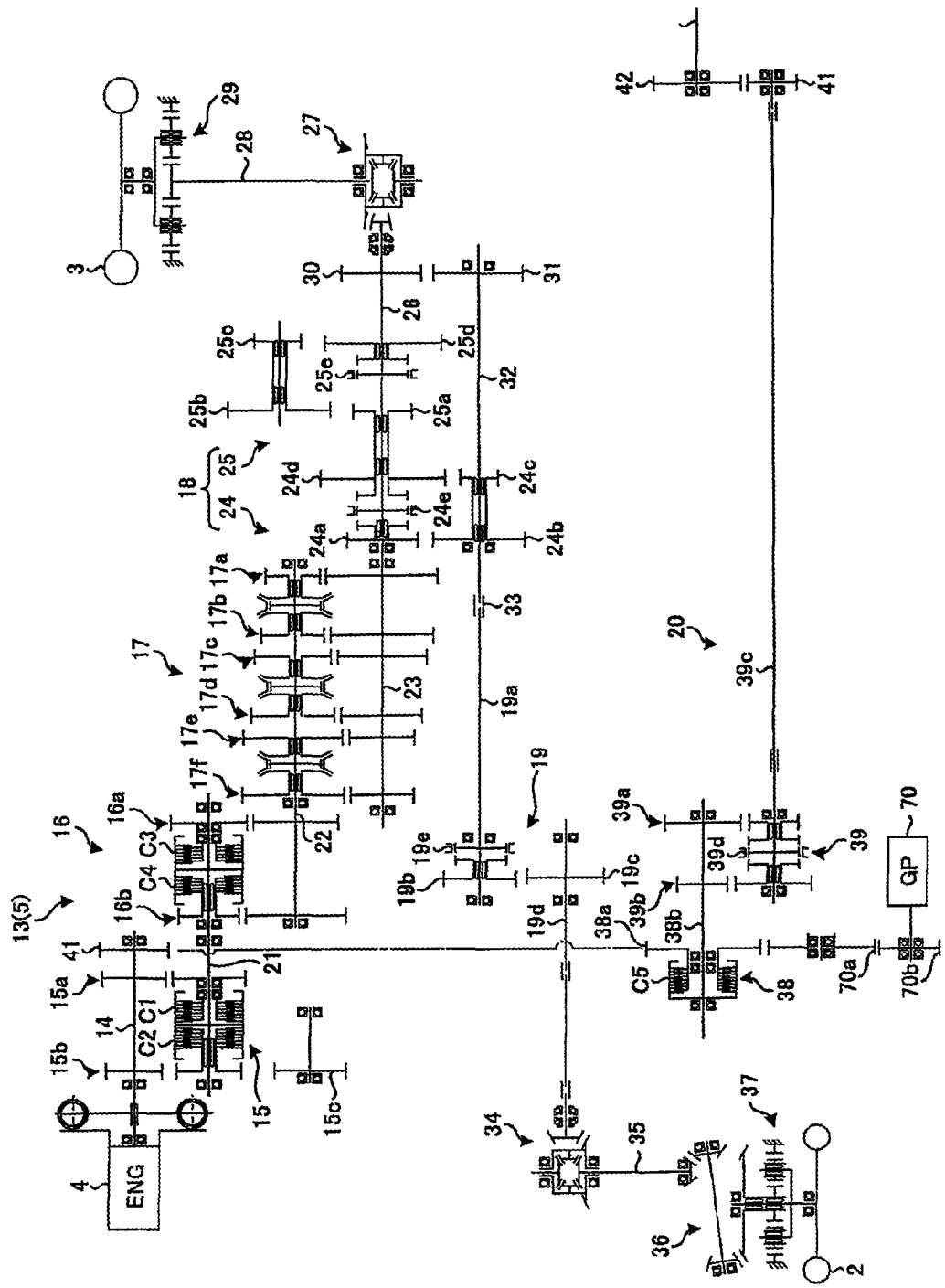
FIG. 5 is a line diagram showing a power transmission mechanism of a change speed device of the tractor according to an illustrative embodiment.
Figure 6:
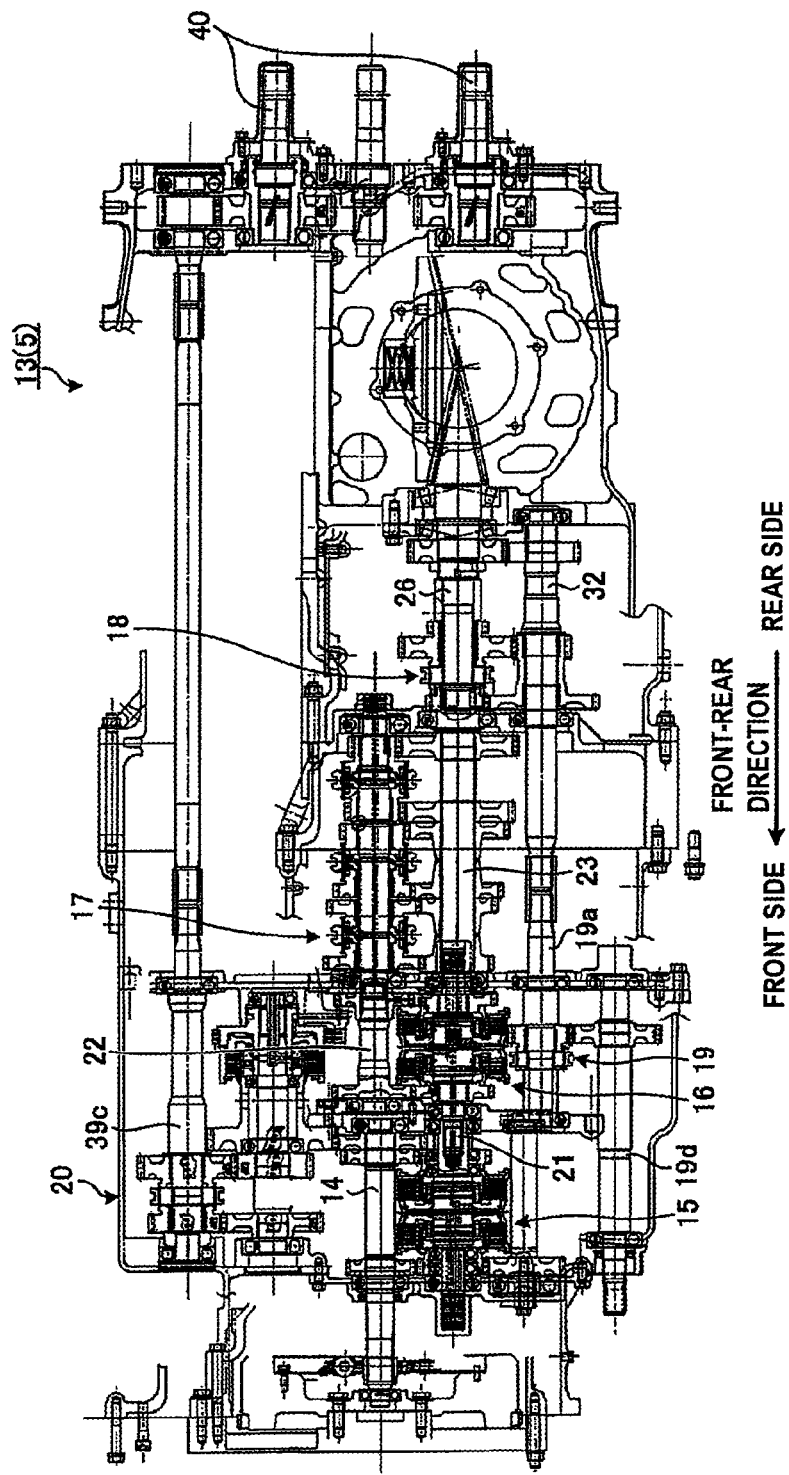
FIG. 6 is a partially developed pictorial view of a section showing the power transmission mechanism of the change speed device of the tractor according to an illustrative embodiment.
Figure 7:
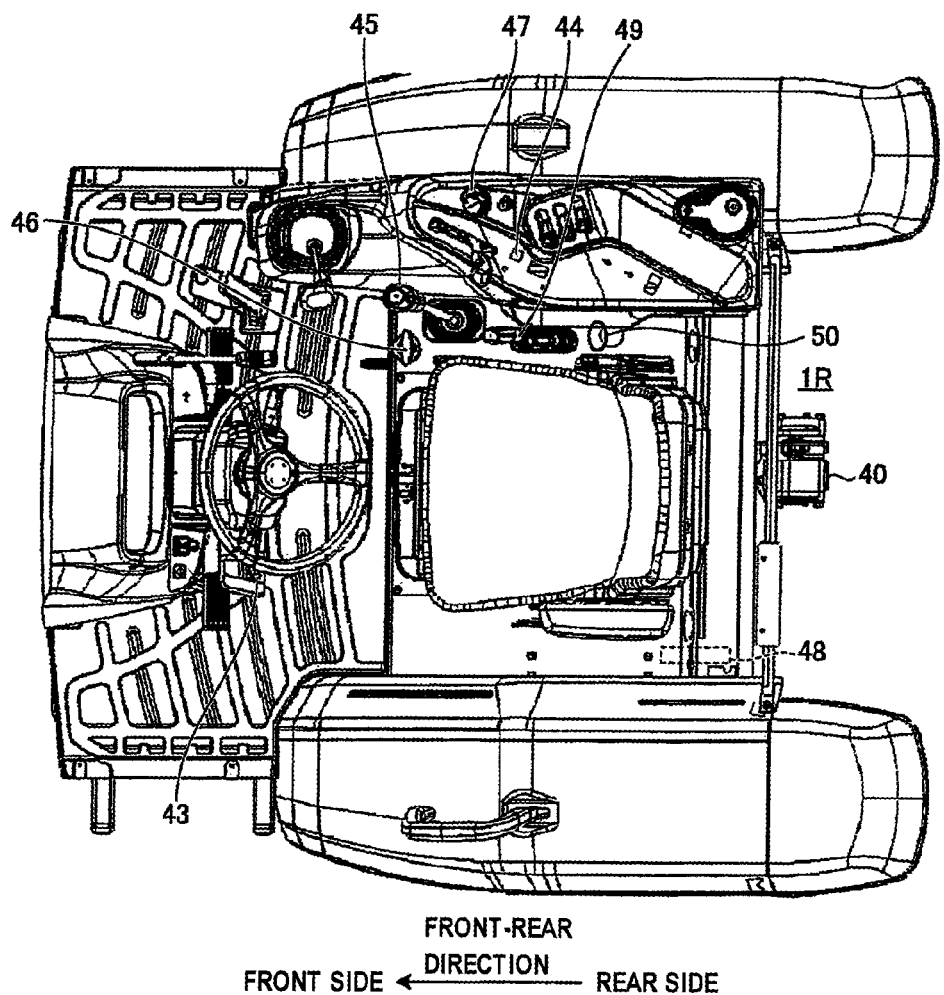
FIG. 7 is a schematic plan view including a cabin inside of the tractor according to an illustrative embodiment.
Figure 8:
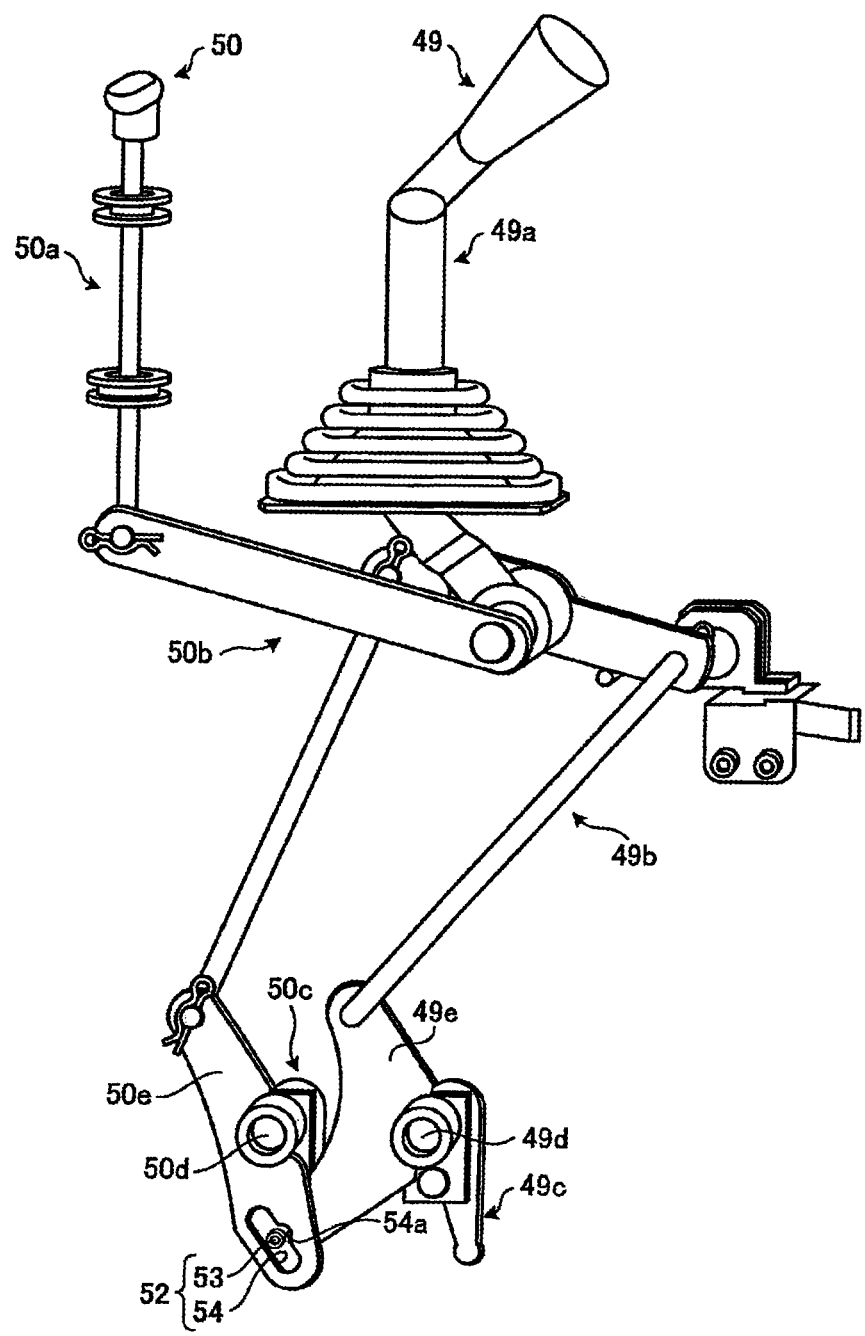
FIG. 8 is a pictorial perspective view including a first auxiliary shift operation lever and a second auxiliary shift operation lever of the tractor according to an illustrative embodiment.
Figure 9:
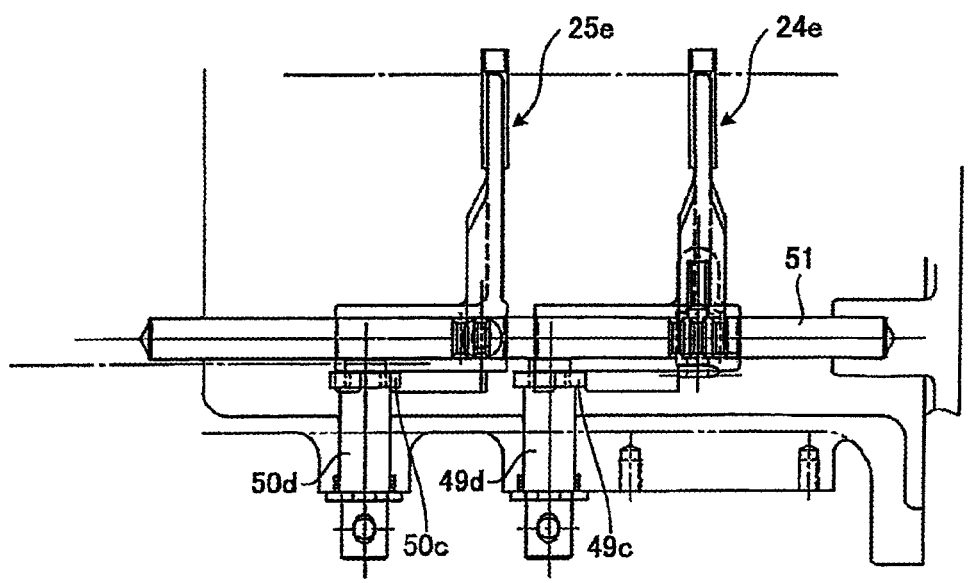
FIG. 9 is a sectional view in the vicinity of a shifter of a auxiliary change speed mechanism of the tractor according to an illustrative embodiment.
Figure 10:
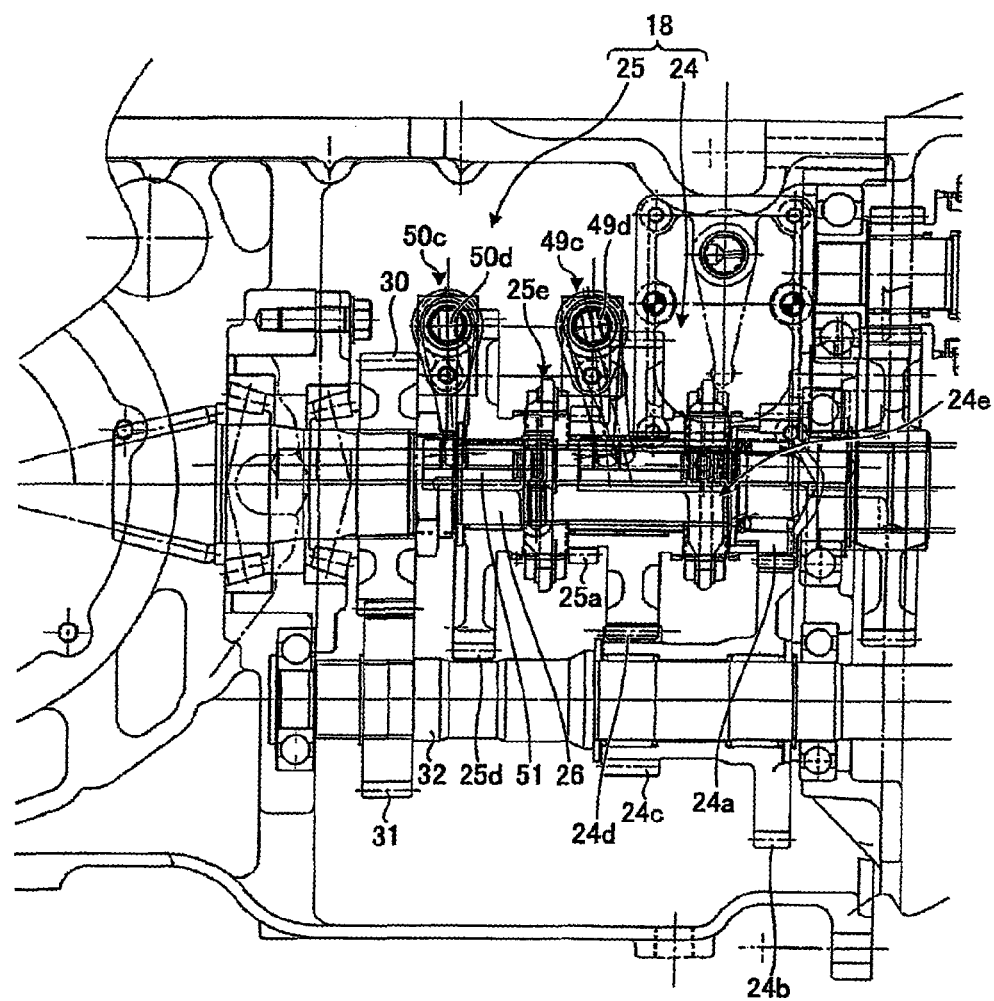
FIG. 10 is a sectional view of a direction along a shifter stay of the auxiliary change speed mechanism of the tractor according to an illustrative embodiment.
Figure 11:
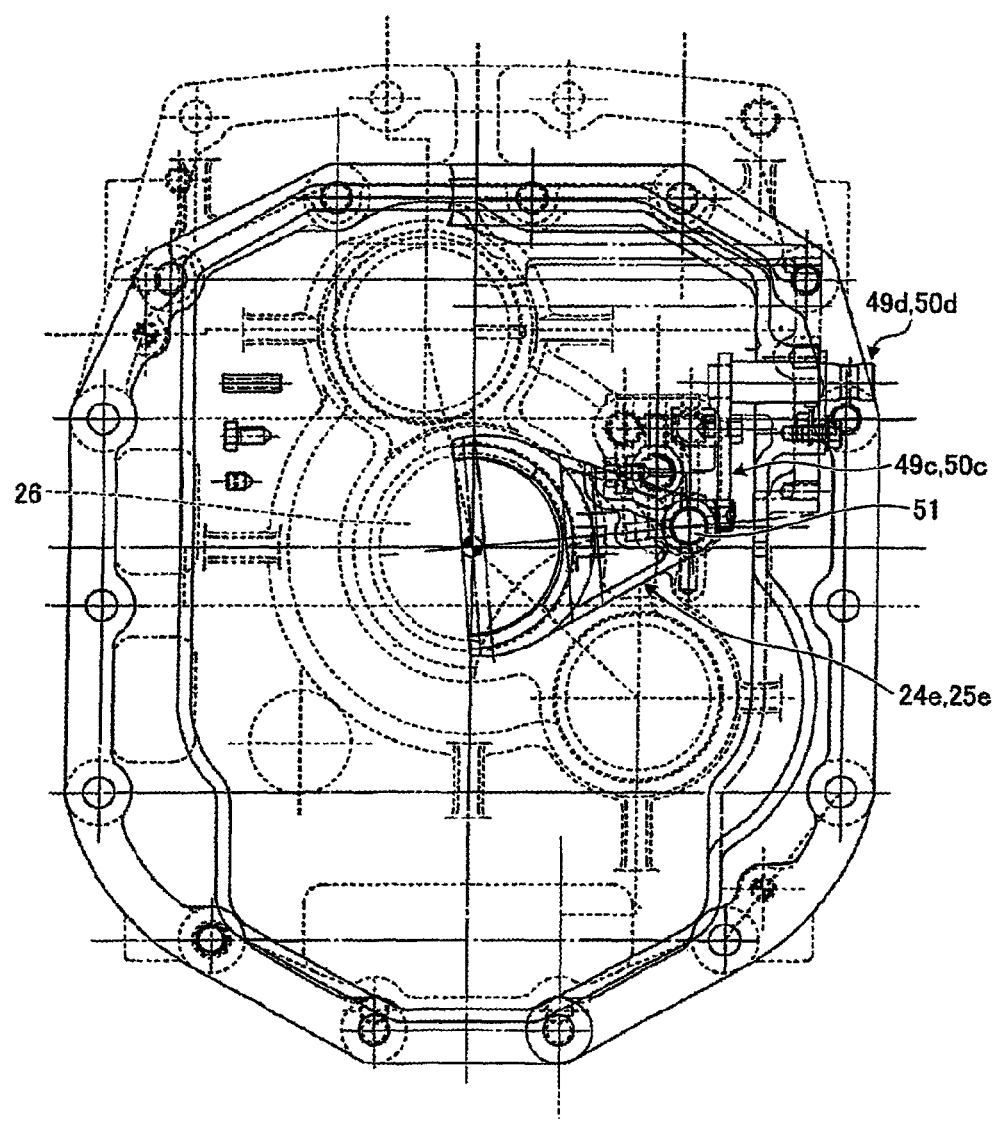
FIG. 11 is a sectional view of a direction intersecting with the shifter stay of the auxiliary change speed mechanism of the tractor according to an illustrative embodiment.
Figure 12:
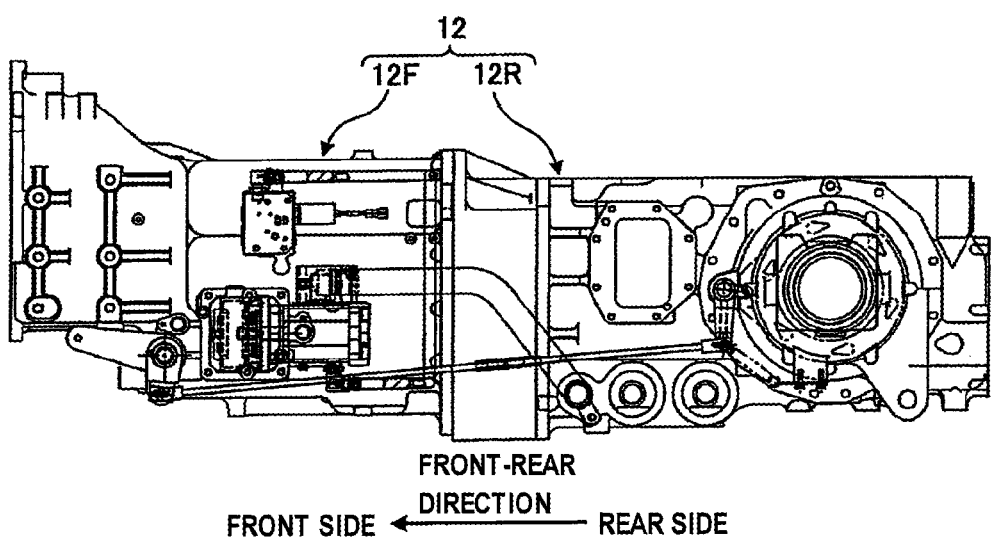
FIG. 12 is a partial side view of a transmission case of the tractor according to an illustrative embodiment, which is seen from a left side in a vehicle width direction.
Figure 13:
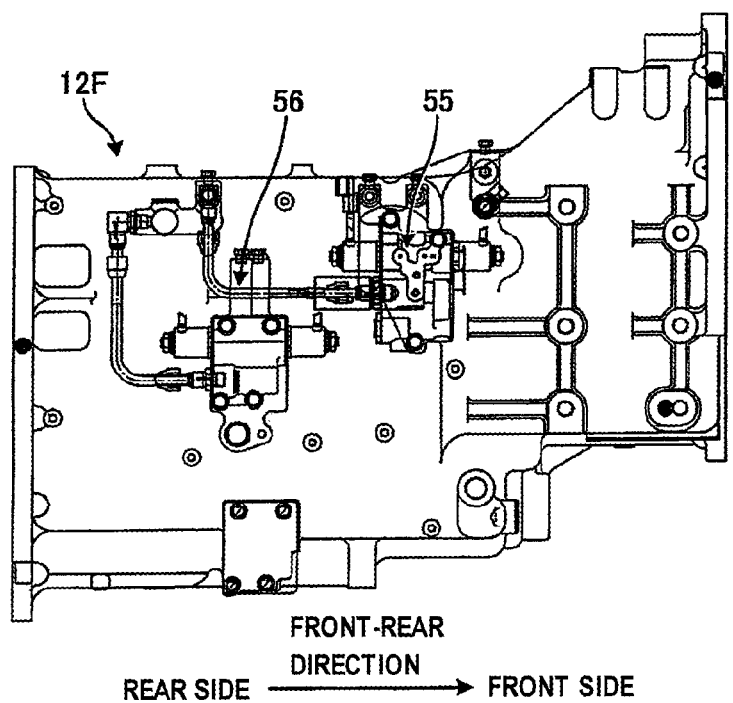
FIG. 13 is a partial side view of a front transmission case of the tractor according to an illustrative embodiment, which is seen from a right side in the vehicle width direction.
Figure 14:
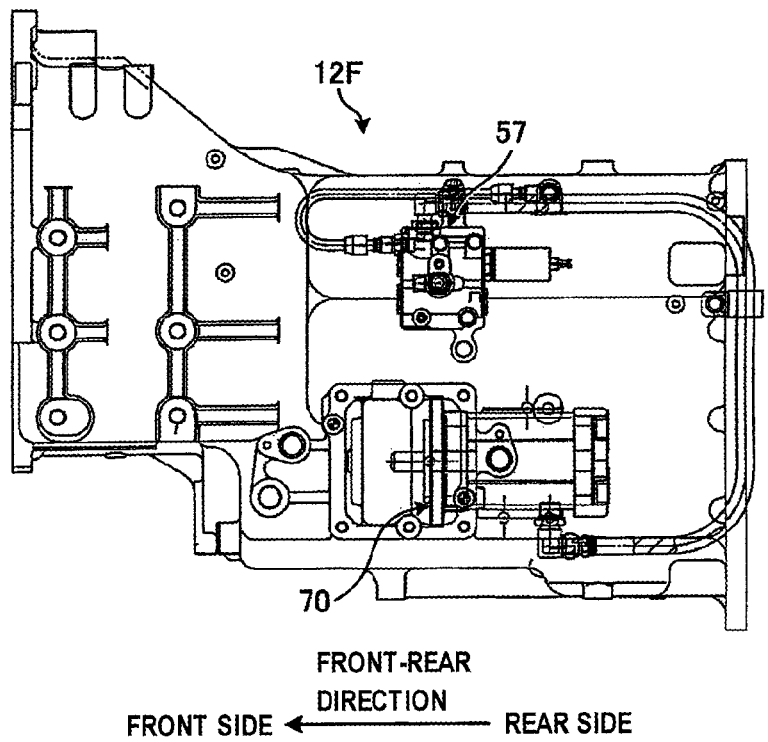
FIG. 14 is a partial side view of the front transmission case of the tractor according to an illustrative embodiment, which is seen from a left side in the vehicle width direction.
Figure 15:
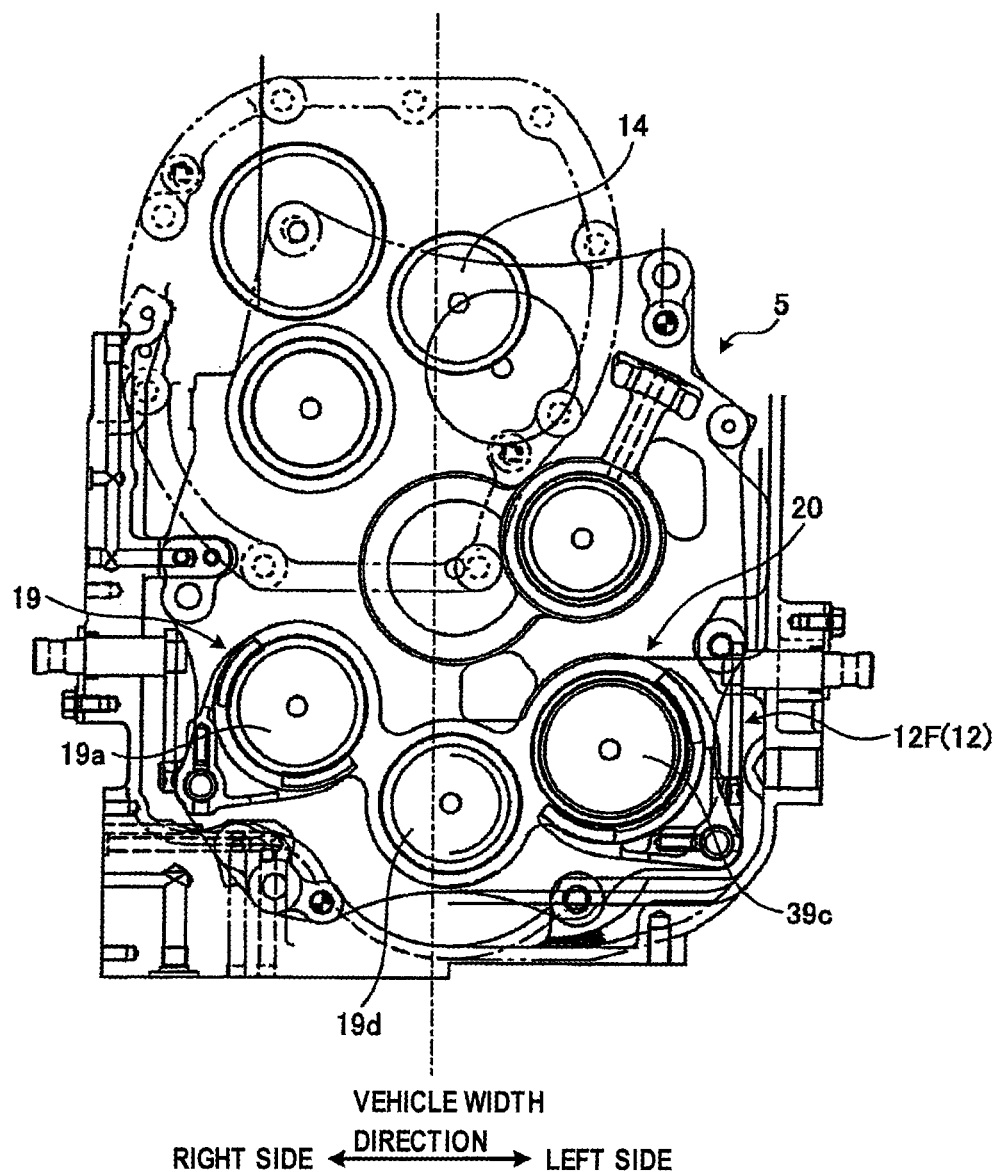
FIG. 15 is a sectional view taken along the vehicle width direction of the change speed device of the tractor according to an illustrative embodiment.
Figure 16:
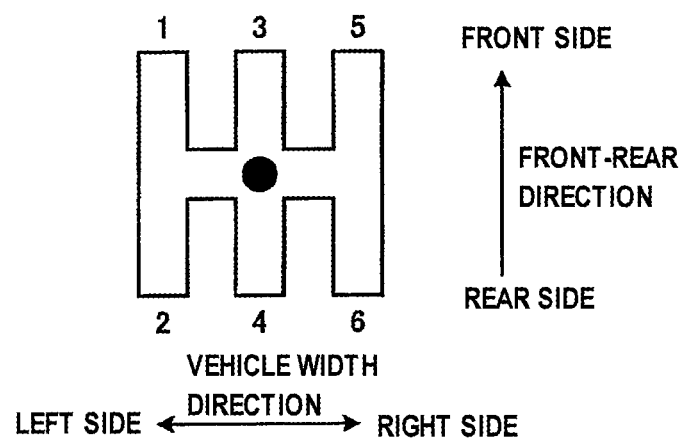
FIG. 16 is a pictorial view illustrating change speed positions of a main shift operation lever of the tractor according to an illustrative embodiment.
Figure 17:
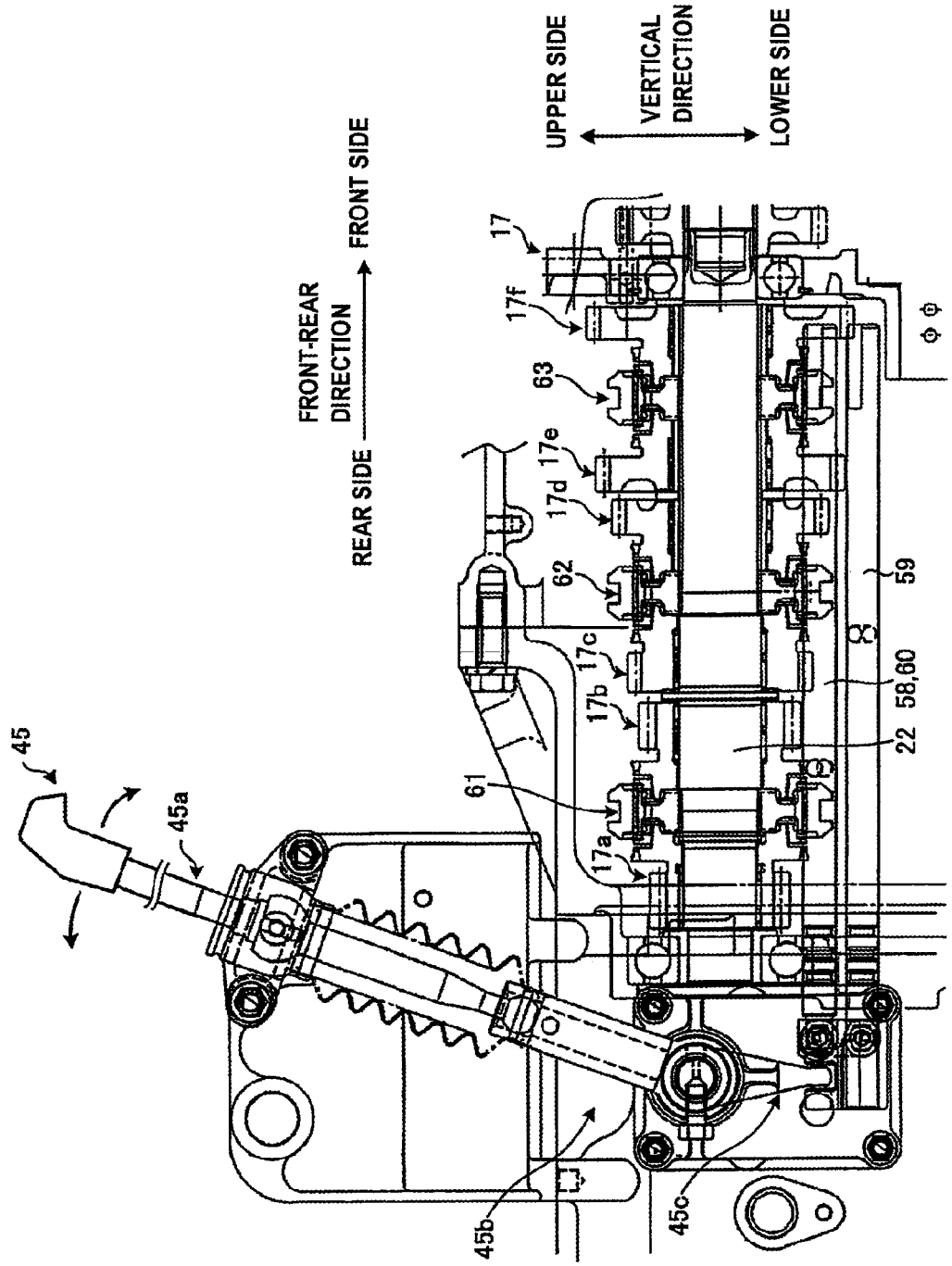
FIG. 17 is a sectional view of a direction along a shifter stay of the main change speed mechanism of the tractor according to an illustrative embodiment.
Figure 18:
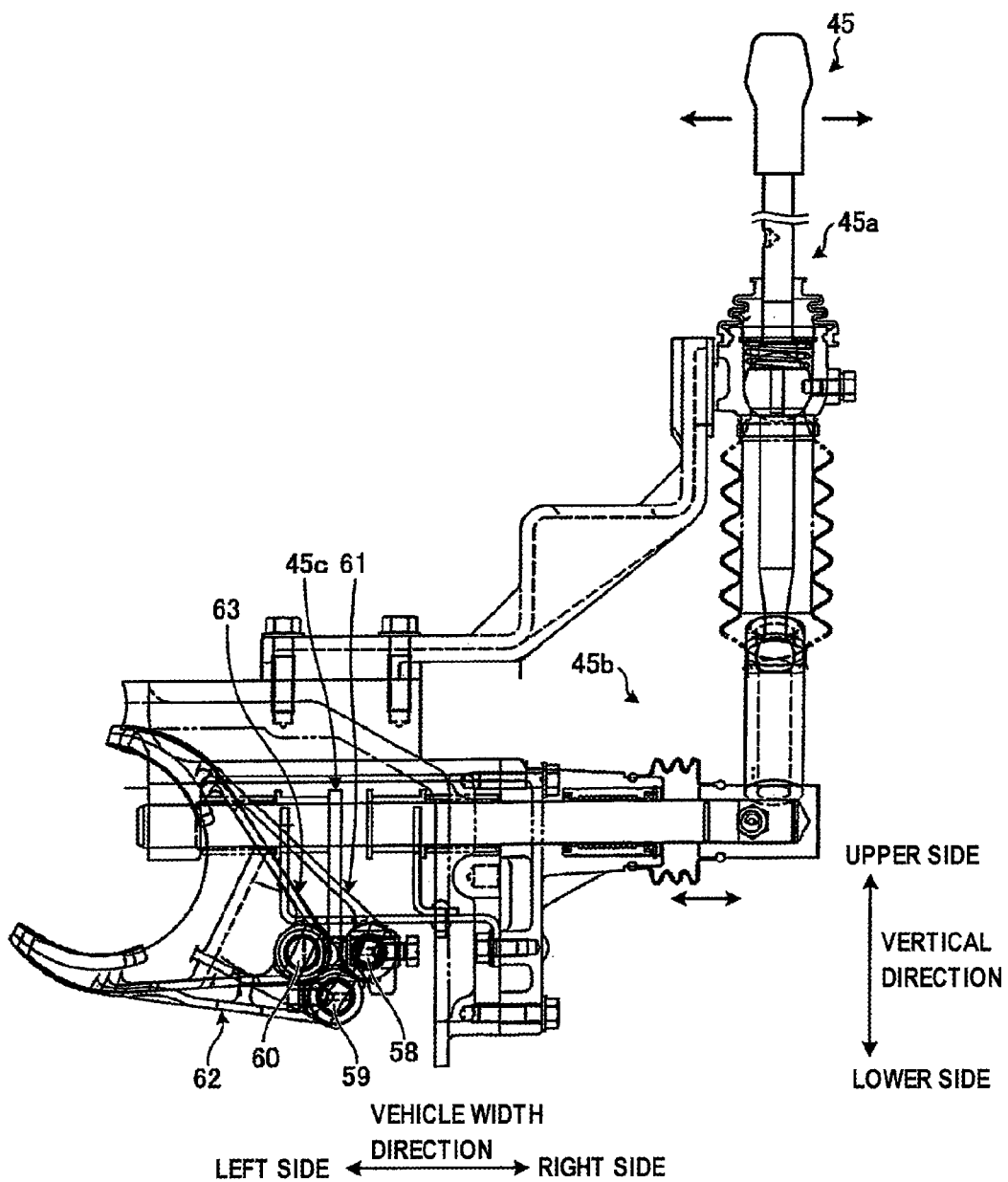
FIG. 18 is a sectional view of a direction intersecting with the shifter stay of the main change speed mechanism of the tractor according to an illustrative embodiment.
Figure 19:
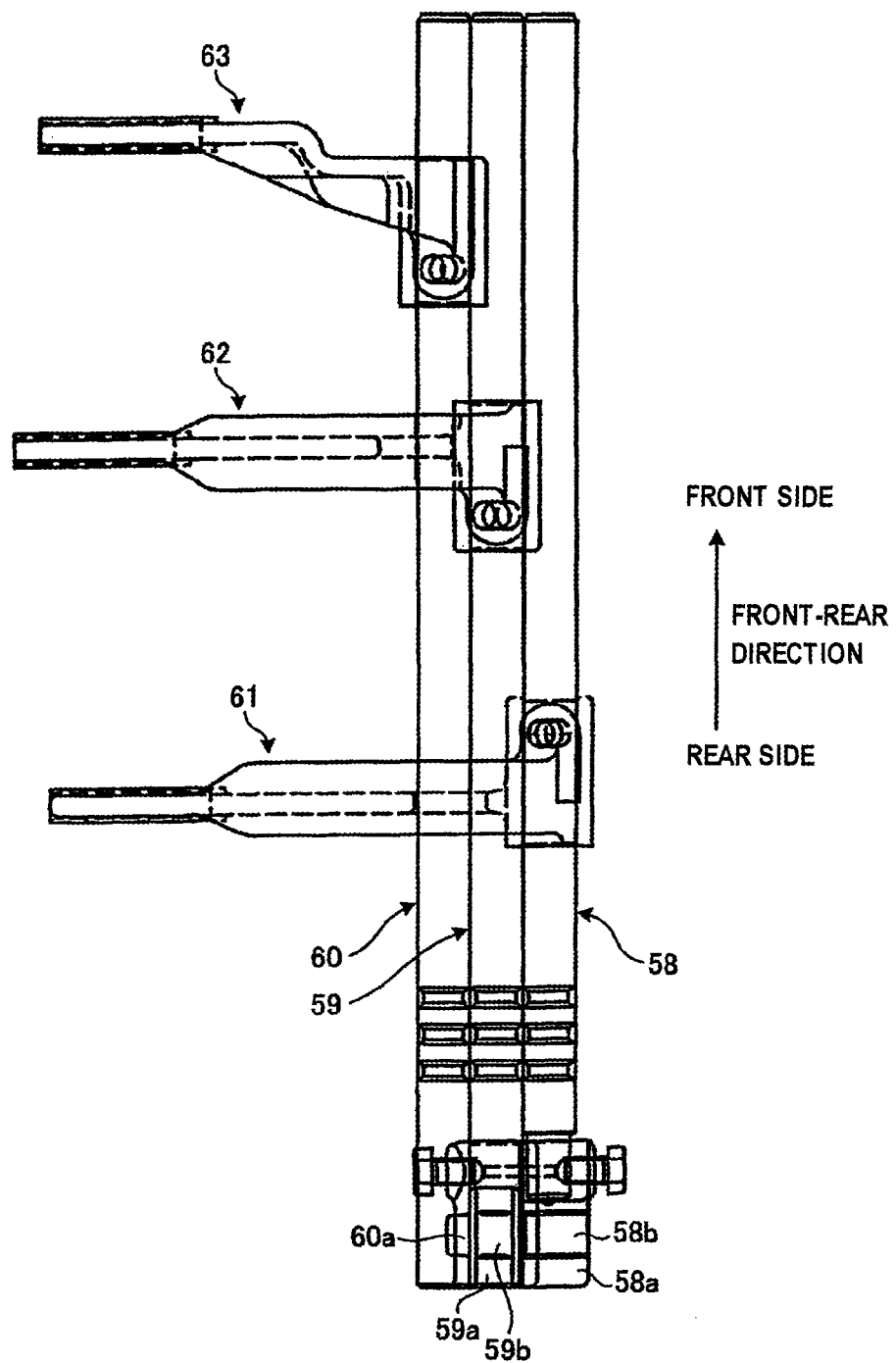
FIG. 19 is a schematic view of the shifter stay and a shifter of the main change speed mechanism of the tractor according to an illustrative embodiment.

FIG. 1 is a schematic view of a tractor according to an illustrative embodiment. FIG. 2 is a view seen from an A arrow direction of FIG. 1 (a view showing a vehicle body front side part). FIG. 3 is a view seen from a B arrow direction of FIG. 1 (a view showing a vehicle body rear side part). FIG. 4 is a view seen from a C arrow direction of FIG. 1 (a view showing a vehicle body upper part). FIG. 5 is a line diagram showing a power transmission mechanism of a change speed device of the tractor according to an illustrative embodiment. FIG. 6 is a partially developed pictorial view of a section showing the power change speed device mechanism of the change speed device of the tractor according to an illustrative embodiment. FIG. 7 is a schematic plan view including a cabin inside of the tractor according to an illustrative embodiment. FIG. 8 is a pictorial perspective view including a first auxiliary shift operation lever and a second auxiliary shift operation lever of the tractor according to an illustrative embodiment. FIG. 9 is a sectional view in the vicinity of a shifter of a auxiliary change speed mechanism of the tractor according to an illustrative embodiment. FIG. 10 is a sectional view of a direction along a shifter stay of the auxiliary change speed mechanism of the tractor according to an illustrative embodiment. FIG. 11 is a sectional view of a direction intersecting with the shifter stay of the auxiliary change speed mechanism of the tractor according to an illustrative embodiment. FIG. 12 is a partial side view of a transmission case of the tractor according to an illustrative embodiment, which is seen from a left side in a vehicle width direction. FIG. 13 is a partial side view of a front transmission case of the tractor according to an illustrative embodiment, which is seen from a right side in the vehicle width direction. FIG. 14 is a partial side view of the front transmission case of the tractor according to an illustrative embodiment, which is seen from a left side in the vehicle width direction. FIG. 15 is a sectional view taken along the vehicle width direction of the change speed device of the tractor according to an illustrative embodiment. FIG. 16 is a pictorial view illustrating transmission positions of a main shift operation lever of the tractor according to an illustrative embodiment. FIG. 17 is a sectional view of a direction along a shifter stay of the main change speed mechanism of the tractor according to an illustrative embodiment. FIG. 18 is a sectional view of a direction intersecting with the shifter stay of the main change speed mechanism of the tractor according to an illustrative embodiment. FIG. 19 is a schematic view of the shifter stay and a shifter of the main change speed mechanism of the tractor according to an illustrative embodiment. FIGS. 20, 21, 22, 23 and 24 are schematic views showing power transmission mechanisms of change speed devices of tractors according to modified embodiments.

Meanwhile, in below descriptions, a front-rear direction is a front-rear direction of a tractor 1. Additionally, the front-rear direction is a traveling direction when the tractor 1 goes straight ahead, and a front side of the traveling direction is referred to as a front side in the front-rear direction and a rear side thereof is referred to as a rear side in the front-rear direction. The traveling direction of the tractor 1 is a direction that is directed from an operator seat 8 of the tractor 1 towards a steering wheel 11 when the tractor 1 takes a straight line, and the steering wheel 11-side is the front side and the operator seat 8 is the rear side. Also, a vehicle width direction is a direction horizontally orthogonal to the front-rear direction. Here, at a state of seeing the front side of the front-rear direction, the right side is referred to as a right side in the vehicle width direction and the left side is referred to as a left side in the vehicle width direction. Also, a vertical direction is a direction orthogonal to the front-rear direction and the vehicle width direction. The front-rear direction, the vehicle width direction and the vertical direction are orthogonal to each other.

The tractor 1 shown in FIGS. 1 to 4, which is a working vehicle of an illustrative embodiment, is a working vehicle that is self-propelled by power generated by a power source and is used for work in a farm field and the like, such as an agricultural tractor. The tractor 1 has front wheels 2, rear wheels 3, an engine 4 that is a power source and a change speed device (transmission) 5. The front wheels 2 are provided mainly as wheels for steering, i.e., steering wheels. The rear wheels 3 are provided mainly as wheels for driving, i.e., drive wheels. The rear wheels 3 are adapted to appropriately decelerate rotating power, which is generated in an engine 4 mounted in a bonnet 6 of a vehicle body front side part 1F, in the change speed device 5 and to transmit the same and generates a driving force by the rotating power. Also, the change speed device 5 is also adapted to transmit the rotating power generated in the engine 4 to the front wheels 2, as required. In this case, the front wheels 2 and the rear wheels 3 are drive wheels and generate a driving power. That is, the change speed device 5 is adapted to switch between a two-wheel driving and a four-wheel driving and can decelerate the rotating power of the engine 4 and transmit the decelerated rotating power to the front wheels 2 and rear wheels 3. Also, the tractor 1 has a connection apparatus 7, to which an implement such as rotary (not shown) can be mounted, at a vehicle body rear side part 1R. The connection apparatus 7 connects the implement to the vehicle body rear side part 1R of the tractor 1 by left and right lower links, a central top link (not shown) and the like. The tractor 1 rotates left and right lift arms 7b by a hydraulic pressure to thereby move up and down the implement through a lift rod 7c, the lower links 7a connected to the lift rod 7c and the like. The tractor 1 is configured so that surroundings of the operator seat 8 on the vehicle body are covered by a cabin 9. The tractor 1 is configured so that a steering wheel 11 is provided to stand from a dashboard 10 at the front side of the operator seat 8 and a variety of operations pedals such as a clutch pedal, a brake pedal, an foot throttle pedal and the like and a variety of operations levers such as an advancing and reversing lever, a gearshift lever and the like are arranged around the operator seat 8 in the cabin 9.

FIGS. 5 and 6 are line diagrams showing a power transmission mechanism 13 in a transmission case 12 of the change speed device 5. The change speed device 5 includes the transmission case 12 (refer to FIG. 1) and the power transmission mechanism 13 that is arranged in the transmission case 12 and transmits the rotating power from the engine 4 to the rear wheels 3 and the like. The power transmission mechanism 13 transmits the rotating power from the engine 4 to the front wheels 2, the rear wheels 3 and the implement mounted to the vehicle body and drives the same by the rotating power from the engine 4.

Specifically, the power transmission mechanism 13 includes an input shaft 14, an advancing and reversing switching mechanism (switching mechanism) 15, a Hi-Lo change speed mechanism 16 serving as a high-low change speed mechanism, a main change speed mechanism 17, a auxiliary change speed mechanism 18, a 2WD/4WD switching mechanism 19, a PTO (Power take-off) driving mechanism 20 and the like. The power transmission mechanism 13 can transmit the rotating power generated by the engine 4 to the rear wheels 3 through the input shaft 14, the advancing and reversing switching mechanism 15, the Hi-Lo change speed mechanism 16, the main change speed mechanism 17 and the auxiliary change speed mechanism 18 in corresponding order. Also, the power transmission mechanism 13 can transmit the rotating power generated by the engine 4 to the front wheels 2 through the input shaft 14, the advancing and reversing switching mechanism 15, the Hi-Lo change speed mechanism 16, the main change speed mechanism 17, the auxiliary change speed mechanism 18 and the 2WD/4WD switching mechanism 19 in corresponding order. Also, the power transmission mechanism 13 can transmit the rotating power generated by the engine 4 to the implement through the input shaft 14 and the PTO driving mechanism 20 in corresponding order.

The input shaft 14 is coupled with an output shaft of the engine 4 and is transmitted (input) with the rotating power from the engine 4.

The advancing and reversing switching mechanism 15 can switch the rotating power transmitted from the engine 4 to advancing direction rotation or reversing direction rotation. The advancing and reversing switching mechanism 15 includes an advancing-side gear stage 15a, a reversing-side gear stage 15b, a reverse gear 15c, a hydraulic multiple disk clutch (advancing clutch) C1 and a hydraulic multiple disk clutch (reversing clutch) C2. The hydraulic multiple disk clutches C1, C2 can switch a power transmission path in the advancing and reversing switching mechanism 15 by switching an engaged/release state thereof. The advancing and reversing switching mechanism 15 changes the transmission path of the rotating power transmitted to the input shaft 14 and then transmits the rotating power to a counter shaft 21 in accordance with the engaged/release states of the hydraulic multiple disk clutches C1, C2. When the hydraulic multiple disk clutch C1 is at the engaged state and the hydraulic multiple disk clutch C2 is at the release state, the advancing and reversing switching mechanism 15 transmits the rotating power transmitted to the input shaft 14 to the counter shaft 21 in the advancing direction rotation through the advancing-side gear stage 15a and the hydraulic multiple disk clutch C2. When the hydraulic multiple disk clutch C1 is at the release state and the hydraulic multiple disk clutch C2 is at the engaged state, the advancing and reversing switching mechanism 15 transmits the rotating power transmitted to the input shaft 14 to the counter shaft 21 in the reversing direction rotation through the reversing-side gear stage 15b, the reverse gear 15c and the hydraulic multiple disk clutch C2. Thereby, the advancing and reversing switching mechanism 15 can switch the advancing and reversing of the tractor 1. Also, the advancing and reversing switching mechanism 15 also functions as a main clutch and becomes a neutral state and interrupts the power transmission to the rear wheels 3 by enabling all the hydraulic multiple disk clutches C1, C2 to be at the release state. For example, when an operator operates an advancing and reversing switching lever 43 (refer to FIG. 7), the advancing and reversing switching mechanism 15 can switch the advancing, the reversing and the neutral by hydraulic control. Also, when the operator depresses a clutch pedal, the advancing and reversing switching mechanism 15 can release all the hydraulic multiple disk clutches C1, C2.

The Hi-Lo change speed mechanism 16 can speed-change the rotating power transmitted from the engine 4 to a high-speed stage or low-speed stage. The Hi-Lo change speed mechanism 16 includes a Hi (high speed)-side gear stage 16a, a Lo (low speed)-side gear stage 16b, a hydraulic multiple disk clutch (Hi (high speed)-side clutch) C3 and a hydraulic multiple disk clutch (Lo (low speed)-side clutch) C4. The hydraulic multiple disk clutches C3, C4 can switch the power transmission path in the Hi-Lo change speed mechanism 16 by switching an engaged/release state. The Hi-Lo change speed mechanism 16 changes the transmission path of the rotating power transmitted to the counter shaft 21 and then transmits the rotating power to a gearshift shaft 22 in accordance with the engaged/release states of the hydraulic multiple disk clutches C3, C4. When the hydraulic multiple disk clutch C3 is at the engaged state and the hydraulic multiple disk clutch C4 is at the release state, the Hi-Lo change speed mechanism 16 speed-changes the rotating power, which is transmitted to the counter shaft 21, through the hydraulic multiple disk clutch C3 and the Hi-side gear stage 16a and transmits the same to the gearshift shaft 22. When the hydraulic multiple disk clutch C3 is at the release state, and the hydraulic multiple disk clutch C4 is at the engaged state, the Hi-Lo change speed mechanism 16 speed-changes the rotating power, which is transmitted to the counter shaft 21, through the hydraulic multiple disk clutch C4 and the Lo-side gear stage 16b and transmits the same to the gearshift shaft 22. Thereby, the Hi-Lo change speed mechanism 16 can speed-change the rotating power from the engine 4 with a change gear ratio of the Hi-side gear stage 16a or Lo (low speed)-side gear stage 16b and transmit the same to a rear stage. When an operator turns on/off a Hi-Lo switching switch (high-low gearshift operation switch: high-low switch) 44 (refer to FIG. 7), for example, the Hi-Lo change speed mechanism 16 can switch a Hi (high speed)-side and a Lo (low speed)-side by the hydraulic control and can change speed to any one of two high-speed and low-speed stages. Also, the Hi-Lo change speed mechanism 16 can change speed by the above configuration during the traveling of the tractor 1.

The main change speed mechanism 17 can speed-change the rotating power transmitted from the engine 4 to any one of a plurality of gearshift stages. The main change speed mechanism 17 is a synchromesh change speed mechanism and can speed-change the rotating power that is transmitted from the engine 4 through the advancing and reversing switching mechanism 15 and the Hi-Lo change speed mechanism 16. The main change speed mechanism 17 includes a plurality of gearshift stages of a first-speed gear stage 17a, a second-speed gear stage 17b, a third-speed gear stage 17c, a fourth-speed gear stage 17d, a fifth-speed gear stage 17e and a sixth-speed gear stage 17f. The main change speed mechanism 17 speed-changes the rotating power, which is transmitted to the gearshift shaft 22, through any one of the first-speed gear stage 17a to the sixth-speed gear stage 17f and transmits the same to a gearshift shaft 23 in accordance with coupling states of the first-speed gear stage 17a to the sixth-speed gear stage 17f with the gearshift shaft 22. Thereby, the main change speed mechanism 17 can speed-change the rotating power from the engine 4 with a change gear ratio of any one of the first-speed gear stage 17a to the sixth-speed gear stage 17f and transmit the same to the rear stage. For example, when an operator operates a main shift operation lever (main lever) 45 (refer to FIG. 7), the main change speed mechanism 17 can select and switch one of the plurality of gearshift stages and change speed to any one of the first-speed gear stage 17a to the sixth-speed gear stage 17f. Also, the main change speed mechanism 17 can change speed by the above configuration during the traveling of the tractor 1.

The auxiliary change speed mechanism 18 can change-speed the rotating power that is transmitted from the engine 4 through the advancing and reversing switching mechanism 15, the Hi-Lo change speed mechanism 16 and the main change speed mechanism 17 in corresponding order. The auxiliary change speed mechanism 18 includes a first auxiliary change speed mechanism 24, a second auxiliary change speed mechanism 25 and the like and transmits speed-changes the rotating power, which is transmitted to the gearshift shaft 23, through the first auxiliary change speed mechanism 24, the second auxiliary change speed mechanism 25 and the like and transmits the same to a gearshift shaft 26. The first auxiliary change speed mechanism 24 can speed-change the rotating power, which is transmitted from the engine 4 and is speed-changed in the main change speed mechanism 17 and the like, to the high speed stage or low speed stage and transmit the same to the rear wheels 3 that are the drive wheels. The second auxiliary change speed mechanism 25 can speed-change the rotating power, which is transmitted from the engine 4 and is speed-changed in the main change speed mechanism 17 and the like, to an extreme low speed stage that is further lower than the first auxiliary change speed mechanism 24 and transmit the same to the rear wheels 3 that are the drive wheels.

The first auxiliary change speed mechanism 24 of the auxiliary change speed mechanism 18 includes a first gear 24a, a second gear 24b, a third gear 24c, a fourth gear 24d and a shifter 24e (first shifter). The first gear 24a is integrally rotatably coupled with the gearshift shaft 23 and is transmitted (input) with the rotating power from the gearshift shaft 23. The second gear 24b is meshed with the first gear 24a. The third gear 24c is integrally rotatably coupled with the second gear 24b. The fourth gear 24d is meshed with the third gear 24c. The shifter 24e is to switch the coupling states of the first gear 24a and the fourth gear 24d with the gearshift shaft 26. The shifter 24e can be moved to a Hi (high speed)-side position at which the first gear 24a and the gearshift shaft 26 are integrally rotatably coupled, a Lo (low speed)-side position at which the fourth gear 24d and the gearshift shaft 26 are integrally rotatably coupled and a neutral position at which both the first gear 24a and the fourth gear 24d are released without being coupled with the gearshift shaft 26. The first auxiliary change speed mechanism 24 switches the transmission path of the rotating power transmitted to the gearshift shaft 23 and transmits the same to the gearshift shaft 26 in accordance with a position of the shifter 24e. When the shifter 24e is located at the Hi-side position, the first auxiliary change speed mechanism 24 transmits the rotating power transmitted to the gearshift shaft 23 from the first gear 24a to the gearshift shaft 26 without through the second gear 24b, the third gear 24c and the fourth gear 24d (the rotating power is transmitted in order of the gearshift shaft 23, the first gear 24a and the gearshift shaft 26). When the shifter 24e is located at the Lo-side position, the first auxiliary change speed mechanism 24 sequentially decelerates the rotating power, which is transmitted to the gearshift shaft 23, from the first gear 24a through the second gear 24b, the third gear 24c, the fourth gear 24d and the shifter 24e and transmits the same to the gearshift shaft 26. Thereby, the first auxiliary change speed mechanism 24 can speed-change the rotating power from the engine 4 with a change gear ratio of the Hi (high speed)-side without through the second gear 24b, the third gear 24c and the fourth gear 24d or with a change gear ratio of the Lo (low speed)-side through the second gear 24b, the third gear 24c and the fourth gear 24d and transmit the same to the rear stage. Also, when the shifter 24e is located at the neutral position, the first auxiliary change speed mechanism 24 is at a neutral state where both the first gear 24a and the fourth gear 24d run idle relative to the gearshift shaft 26. For example, when an operator operates a first auxiliary shift operation lever (first lever) 49 (refer to FIG. 7), the position of the shifter 24e is switched, so that the first auxiliary change speed mechanism 24 can switch the Hi (high speed)-side, Lo (low speed)-side and neutral positions.

The second auxiliary change speed mechanism 25 of the auxiliary change speed mechanism 18 includes a first gear 25a, a second gear 25b, a third gear 25c, a fourth gear 25d and a shifter 25e (second shifter). The first gear 25a is integrally rotatably coupled with the fourth gear 25d. The second gear 25b is meshed with the first gear 25a. The third gear 25c is integrally rotatably coupled with the second gear 25b. The fourth gear 25d is meshed with the third gear 25c. The shifter 25e is to switch the coupling state of the fourth gear 24d with the gearshift shaft 26. The shifter 25e can be moved to an extreme Lo (extreme low speed)-side position at which the fourth gear 25d and the gearshift shaft 26 are integrally rotatably coupled and a neutral position at which the fourth gear 24d is released without being coupled with the gearshift shaft 26. The second auxiliary change speed mechanism 25 switches the transmission path of the rotating power transmitted to the gearshift shaft 23 and transmits the same to the gearshift shaft 26 in accordance with a position of the shifter 25e. When the shifter 25e is located at the extreme Lo-side position under state where the first auxiliary change speed mechanism 24 is at the neutral state, the second auxiliary change speed mechanism 25 sequentially decelerates the rotating power, which is transmitted to the gearshift shaft 23, from the first gear 24a of the first auxiliary change speed mechanism 24 through the second gear 24b, the third gear 24c, the fourth gear 24d and the first gear 25a, the second gear 25b, the third gear 24c, the fourth gear 25d and the shifter 25e of the second auxiliary change speed mechanism 25 and transmits the same to the gearshift shaft 26. Thereby, the second auxiliary change speed mechanism 25 can speed-change the rotating power from the engine 4 with a change gear ratio of the extreme Lo (low speed)-side through the second gear 24b, the third gear 24c, the fourth gear 24d, the first gear 25a, the second gear 25b, the third gear 24c and the fourth gear 25d and transmit the same to the rear stage. Also, when the shifter 25e is located at the neutral position, the second auxiliary change speed mechanism 25 is at a neutral state where the fourth gear 24d runs idle relative to the gearshift shaft 26. When the first auxiliary change speed mechanism 24 is at the Hi (high speed)-side or Lo (low speed)-side, the second auxiliary change speed mechanism 25 is at the neutral state. For example, when an operator operates a second auxiliary shift operation lever (second lever) 50 (refer to FIG. 7), the position of the shifter 25e is switched, so that the second auxiliary change speed mechanism 25 can switch the extreme Lo (low speed)-side and neutral positions.

Therefore, the auxiliary change speed mechanism 18 can speed-change the rotating power transmitted to the gearshift shaft 23 to any one of the high speed, low speed and extreme low speed stages and transmit the same to the gearshift shaft 26 by combining the first auxiliary change speed mechanism 24 and the second auxiliary change speed mechanism 25. That is, when the first auxiliary change speed mechanism 24 is at the Hi (high speed)-side and the second auxiliary change speed mechanism 25 is at the neutral state, the auxiliary change speed mechanism 18 can change speed to the Hi (high speed) stage. When the first auxiliary change speed mechanism 24 is at the Lo (low speed)-side and the second auxiliary change speed mechanism 25 is at the neutral state, the auxiliary change speed mechanism 18 can change speed to the Lo (high speed) stage. When the first auxiliary change speed mechanism 24 is at the neutral state and the second auxiliary change speed mechanism 25 is at the extreme Lo (extreme low speed)-side, the auxiliary change speed mechanism 18 can change speed to the extreme Lo (extreme low speed) stage. The auxiliary change speed mechanism 18 switches the high speed, low speed and extreme low speed stages at a state where the tractor 1 stops.

The power transmission mechanism 13 of the change speed device 5 transmits the rotating power, which is transmitted to the gearshift shaft 26, to the rear wheels 3 through a rear wheel differential 27, an axle (drive shaft) 28, a planetary gear mechanism 29 and the like. As a result, the rear wheels 3 of the tractor 1 are rotated as the drive wheels by the rotating power from the engine 4.

Summarizing the above descriptions, the rotation of the input shaft 14 is first switched to the forward rotation or reverse rotation by the advancing and reversing switching mechanism 15, is speed-changed to any one of the two high speed and low speed stages by the Hi-Lo change speed mechanism 16, is speed-changed to any one of the first speed gear stage 17a to the sixth speed gear stage 17f by the main change speed mechanism 17, is speed-changed to any one of the three high speed, low speed and extreme low speed stages by the auxiliary change speed mechanism 18 and is then transmitted to the axle 28. That is, the rotation of the input shaft 14 is speed-changed to any one of 36 stages (=2×6×3) and is then transmitted to the axle 28 by the power transmission mechanism 13 of the change speed device 5.

The 2WD/4WD switching mechanism 19 is to switch whether to transmit the rotating power transmitted to the gearshift shaft 26 to the front wheels 2 or not. The 2WD/4WD switching mechanism 19 includes a transmission shaft 19a, a first gear 19b, a second gear 19c, a transmission shaft 19d and a shifter 19e. The transmission shaft 19a is transmitted (input) with the rotating power from the gearshift shaft 26 through a gear 30, a gear 31, a transmission shaft 32, a coupling 33 and the like. The first gear 19b is relatively rotatably mounted to the transmission shaft 19a inserted therein and the second gear 19c is meshed with the first gear 19b. The transmission shaft 19d is integrally rotatably coupled with the second gear 19c. The shifter 19e is to switch the coupling state of the transmission shaft 19a and the first gear 19b. The shifter 19e can be moved to a 4WD position at which the transmission shaft 19a and the first gear 19b are integrally rotatably coupled and a 2WD position (neutral position) at which the transmission shaft 19a and the first gear 19b are released without being coupled to each other. When the shifter 19e is located at the 4WD position, the 2WD/4WD switching mechanism 19 transmits the rotating power transmitted to the transmission shaft 19a to the transmission shaft 19d through the first gear 19b and the second gear 19c. Thereby, the 2WD/4WD switching mechanism 19 can transmit the rotating power from the engine 4 to the front wheels 2. The power transmission mechanism 13 of the change speed device 5 transmits the rotating power transmitted to the transmission shaft 19d to the front wheels 2 through a front wheel differential 34, an axle (drive shaft) 35, a vertical shaft 36, a planetary gear mechanism 37 and the like. As a result, the front wheels 2 and the rear wheels 3 are rotated as the drive wheels by the rotating power from the engine 4, so that the tractor 1 can travel with the four-wheels driving. When the shifter 19e is located at the 2WD position, the 2WD/4WD switching mechanism 19 interrupts the rotating power transmitted to the transmission shaft 19a from being power-transmitted to the transmission shaft 19*d*. As a result, the tractor 1 can travel with the two-wheel driving. When an operator operates a 2WD/4WD switching lever 46 (refer to FIG. 7), for example, the position of the shifter 19*e* is switched, so that the 2WD/4WD switching mechanism 19 can switch the two-wheel driving and the four-wheel driving.

The PTO driving mechanism 20 speed-changes the rotating power, which is transmitted from the engine 4, and outputs the same from a PTO shaft 40 (refer to FIG. 3) of the vehicle body rear side part 1R (refer to FIG. 3) to the implement, thereby driving the implement by the power from the engine 4. The PTO driving mechanism 20 includes a PTO clutch mechanism 38, a PTO change speed mechanism 39, the PTO shaft 40 and the like.

The PTO clutch mechanism 38 is to switch the transmission and interruption of the power to the PTO shaft 40. The PTO clutch mechanism 38 includes a gear 38*a*, hydraulic multiple disk clutch C5 and a transmission shaft 38*b*. The gear 38*a* is meshed with a gear 41 that is integrally rotatably coupled with the input shaft 14. The hydraulic multiple disk clutch C5 switches the engaged/release state, thereby switching the power transmission state between the gear 38*a* and the transmission shaft 38*b*. When the hydraulic multiple disk clutch C5 is at the engaged state, the PTO clutch mechanism 38 is at a PTO driving state where the power is transmitted to the PTO shaft 40, and transmits the rotating power, which is transmitted from the input shaft 14 to the gear 38*a* through the gear 41, to the transmission shaft 38*b* through the hydraulic multiple disk clutch C5. When the hydraulic multiple disk clutch C5 is at the release state, the PTO clutch mechanism 38 is at a PTO non-driving state (neutral state) where the power transmission to the PTO shaft 40 is interrupted, and interrupts the rotating power transmitted to the gear 38*a* from being transmitted to the transmission shaft 38*b*. When an operator turns on/off a PTO switching switch 47 (refer to FIG. 7), the PTO clutch mechanism 38 can switch the PTO driving state and the PTO non-driving state by the hydraulic control. In the meantime, the tractor 1 is provided with a gear pump 70 through a gear 70*a* meshed with the gear 38*a*, a gear 70*b* meshed with the gear 70*a* and the like. The gear pump 70 provides a hydraulic pressure to a hydraulic system such as the power transmission mechanism 13.

The PTO change speed mechanism 39 is to speed-change when transmitting the power to the PTO shaft 40. The PTO change speed mechanism 39 includes a Hi (high speed)-side gear stage 39*a*, a Lo (low speed)-side gear stage 39*b*, a transmission shaft 39*c* and a shifter 39*d*. The PTO change speed mechanism 39 speed-changes the rotating power, which is transmitted to the transmission shaft 38*b*, through the Hi-side gear stage 39*a* or Lo-side gear stage 39*b* in accordance with a position of the shifter 39*d* and transmits the same to the transmission shaft 39*c*. The shifter 39*d* is to switch the coupling states of the Hi-side gear stage 39*a* and the Lo-side gear stage 39*b* with the transmission shaft 39*c*. The shifter 39*d* can be moved to a Hi (high speed)-side position at which the Hi-side gear stage 39*a* and the transmission shaft 39*c* are coupled, a Lo (low speed)-side position at which the Lo-side gear stage 39*b* and the transmission shaft 39*c* are coupled and a neutral position at which both the Hi-side gear stage 39*a* and the Lo-side gear stage 39*b* are released without being coupled with the transmission shaft 39*c*. When the shifter 39*d* is located at the Hi-side position, the PTO change speed mechanism 39 transmits the rotating power transmitted to the transmission shaft 38*b* to the transmission shaft 39*c* through the Hi-side gear stage 39*a*. When the shifter 39*d* is located at the Lo-side position, the PTO change speed mechanism 39 transmits the rotating power transmitted to the transmission shaft 38*b* to the transmission shaft 39*c* through the Lo-side gear stage 39*b*. Thereby, the PTO change speed mechanism 39 can speed-change the rotating power from the engine 4 with a change gear ratio of the Hi-side gear stage 39*a* or Lo-side gear stage 39*b* and transmit the same to the rear stage. Also, when the shifter 39*d* is at the neutral position, the PTO change speed mechanism 39 is at a neutral state where both the Hi-side gear stage 39*a* and the Lo-side gear stage 39*b* run idle relative to the transmission shaft 39*c*. For example, when an operator operates a PTO gearshift operation lever 48 (refer to FIG. 7), the position of the shifter 39*d* is switched, so that the PTO change speed mechanism 39 can switch the Hi (high speed)-side, Lo (low speed)-side and neutral positions and can change speed to any one of the two high speed and low speed stages.

The PTO shaft 40 is coupled with the implement and transmits the rotating power from the engine 4 to the implement. The rotating power transmitted to the transmission shaft 39*c* is transmitted through the first gear 41, the second gear 42 and the like, so that the PTO shaft 40 is rotated.

Summarizing the above descriptions, the rotation of the input shaft 14 is transmitted to the PTO change speed mechanism 39 through the PTO clutch mechanism 38, is speed-changed to any one of the two high speed and low speed stages by the PTO change speed mechanism 39 and is transmitted to the PTO shaft 40, thereby rotating the PTO shaft 40. As a result, the tractor 1 can speed-change the rotating power, which is transmitted from the engine 4, and output the same from the PTO shaft 40 to the implement, thereby driving the implement.

As shown in FIG. 7, the tractor 1 has a variety of operation levers that is arranged in the cabin 9 (refer to FIG. 1) or at the vehicle body rear side part 1R. The tractor 1 is provided in the cabin 9 with the advancing and reversing switching lever 43, the Hi-Lo switching switch 44, the main shift operation lever 45, the 2WD/4WD switching lever 46 and the PTO switching switch 47. Also, the tractor 1 is provided with the PTO gearshift operation lever 48 at the vehicle body rear side part 1R. The advancing and reversing switching lever 43 is to perform an advancing and reversing switching operation of the advancing and reversing switching mechanism 15 and can switch the advancing and reversing switching mechanism 15 to the advancing, reversing or neutral state when an operator operates the advancing and reversing switching lever 43. The Hi-Lo switching switch 44 is to perform a Hi-Lo gearshift operation (high-low gearshift operation) of the Hi-Lo change speed mechanism 16 and can switch the Hi-Lo change speed mechanism 16 to the high or low speed stage when an operator operates the Hi-Lo switching switch 44. The main shift operation lever 45 is to perform a main shift operation of the main change speed mechanism 17 and can switch the main change speed mechanism 17 to any one of the first speed gear stage 17*a* to the sixth speed gear stage 17*f* or neutral state when an operator operates the main shift operation lever 45. The 2WD/4WD switching lever 46 is to perform the 2WD/4WD switching operation of the 2WD/4WD switching mechanism 19 and can switch the 2WD/4WD switching mechanism 19 to the two-wheel driving or four-wheel driving when an operator operates the 2WD/4WD switching lever 46. The PTO switching switch 47 is to perform a clutch switching operation of the PTO clutch mechanism 38 and can switch the PTO clutch mechanism 38 to the PTO driving state or PTO non-driving state when an operator operates the PTO switching switch 47. The PTO gearshift operation lever 48 is to perform a PTO gearshift operation of the PTO change speed mechanism 39 and can switch the PTO change speed mechanism 39 to the high speed, low speed or neutral state when an operator operates the PTO gearshift operation lever 48.

In this illustrative embodiment, the tractor 1 is separately provided with the first auxiliary shift operation lever 49, which performs a first auxiliary shift operation of the first auxiliary change speed mechanism 24 of the auxiliary change speed mechanism 18, and the second auxiliary change speed operation lever 50, which performs a second auxiliary shift operation of the second auxiliary change speed mechanism 25 of the auxiliary change speed mechanism 18, thereby improving the general versatility. Both the first auxiliary shift operation lever 49 and the second auxiliary change speed operation lever 50 are provided in the cabin 9. In this illustrative embodiment, the tractor 1 is configured so that the second auxiliary change speed mechanism 25 is later mounted and added relative to the first auxiliary change speed mechanism 24 in the auxiliary change speed mechanism 18 and a gearshift stage (for example, extreme low speed stage) can be thus added, and is provided with the second auxiliary shift operation lever 50, which operates the gearshift stage provided by the addition of the second auxiliary change speed mechanism 25, separately from the first auxiliary shift operation lever 49.

Specifically, as shown in FIGS. 8, 9, 10 and 11, the first auxiliary shift operation lever 49 moves the shifter 24e to the Hi (high speed)-side position, Lo (low speed)-side position or neutral position in accordance with a first auxiliary shift operation of an operator. Also, the second auxiliary shift operation lever 50 moves the shifter 25e to the extreme Lo (extreme low speed)-side position or neutral position in accordance with a second auxiliary shift operation of an operator. Here, both the shifter 24e and the shifter 25e are provided to one common shifter stay 51 so that they can be relatively moved in an axial direction. The shifter stay 51 is provided along the front-rear direction. As described above, the shifter 24e integrally rotatably couples the first gear 24a and the gearshift shaft 26 at the Hi-side position, integrally rotatably couples the fourth gear 24d and the gearshift shaft 26 at the Lo-side position and releases the coupling state of the first gear 24a and fourth gear 24d with the gearshift shaft 26 at the neutral position. As described above, the shifter 25e integrally rotatably couples the fourth gear 25d and the gearshift shaft 26 at the extreme Lo-side position and releases the coupling state of the fourth gear 25d with the gearshift shaft 26 at the neutral position.

The first auxiliary shift operation lever 49 is connected to a shifter arm 49c through a rod part 49a, a link mechanism 49b and the like. The shifter arm 49c is connected to the shifter 24e. The first auxiliary shift operation lever 49 is operated along a direction of the first auxiliary shift operation, here the front-rear direction, so that the shifter arm 49c is rotated about a rotary shaft 49d serving as a rotating center together with a link member 49e of the link mechanism 49b. As the first auxiliary shift operation is performed for the first auxiliary shift operation lever 49, the shifter arm 49c is rotated about the rotary shaft 49d serving as a rotating center, thereby moving the shifter 24e to any one of the Hi-side position, the neutral position and the Lo-side position along an axial direction of the shifter stay 51. Here, the neutral position of the shifter 24e is positioned between the Hi-side position and the Lo-side position in the axial direction of the shifter stay 51.

The first auxiliary shift operation lever 49 can be moved to a neutral position, low speed position or high speed position in accordance with the first auxiliary shift operation along the front-rear direction. The neutral position of the first auxiliary shift operation lever 49 is a position that moves the shifter 24e to the neutral position and thus enables the first auxiliary change speed mechanism 24 to be at the neutral state. The low speed position of the first auxiliary shift operation lever 49 is a position that moves the shifter 24e to the Lo-side position and thus enables the first auxiliary change speed mechanism 24 to be at the low speed state. The high speed position of the first auxiliary shift operation lever 49 is a position that moves the shifter 24e to the Hi-side position and thus enables the first auxiliary change speed mechanism 24 to be at the high speed state. The first auxiliary shift operation lever 49 is operated in one of the front-rear direction on the basis of the neutral position, so that it is moved to the low speed position. In the meantime, the first auxiliary shift operation lever 49 is operated in the other of the front-rear direction on the basis of the neutral position, so that it is moved to the high speed position. As a result, an operator can switch the position of the shifter 24e and switch the first auxiliary change speed mechanism 24 to any one of the high speed, low speed and neutral positions by performing a gearshift operation for the first auxiliary shift operation lever 49 in accordance with the direction of the first auxiliary shift operation.

The second auxiliary shift operation lever 50 is connected to a shifter arm 50c through a rod part 50a, a link mechanism 50b and the like. The shifter arm 50c is connected to the shifter 25e. The second auxiliary shift operation lever 50 is operated along a direction of the second auxiliary shift operation, here the vertical direction, so that the shifter arm 50c is rotated about a rotating shaft 50d serving as a rotating center together with a link member 50e of the link mechanism 50b. As the second auxiliary shift operation is performed for the second auxiliary shift operation lever 50, the shifter arm 50c is rotated about the rotating shaft 50d serving as a rotating center, thereby moving the shifter 25e to any one of the extreme Lo-side position and the neutral position along the axial direction of the shifter stay 51.

The second auxiliary shift operation lever 50 can be moved to a neutral position or extreme low speed position in accordance with the second auxiliary shift operation along the vertical direction. The neutral position of the second auxiliary shift operation lever 50 is a position that moves the shifter 25e to the neutral position and thus enables the second auxiliary change speed mechanism 25 to be at the neutral state. The extreme low speed position of the second auxiliary shift operation lever 50 is a position that moves the shifter 25e to the extreme Lo-side position and thus enables the second auxiliary change speed mechanism 25 to be at the extreme low speed state. The second auxiliary shift operation lever 50 is operated in one of the vertical direction on the basis of the neutral position, so that it is moved to the extreme low speed position. As a result, an operator can switch the position of the shifter 25e and switch the second auxiliary change speed mechanism 25 to any one of the extreme low speed and neutral positions by performing a gearshift operation for the second auxiliary shift operation lever 50 in accordance with the direction of the second auxiliary shift operation.

Here, as described above, the auxiliary change speed mechanism 18 is configured so that when the first auxiliary change speed mechanism 24 is at the Hi-side or Lo-side, the second auxiliary change speed mechanism 25 is at the neutral state and when the second auxiliary change speed mechanism 25 is at the extreme Lo-side, the first auxiliary change speed mechanism 24 is at the neutral state.

In this illustrative embodiment, as shown in FIG. 8, considering the above descriptions, the tractor 1 has a regulating mechanism 52 to thus prevent mechanical lock in the auxiliary change speed mechanism 18. The regulating mechanism 52 limits the second auxiliary shift operation of the second auxiliary change speed operation lever 50 when the gearshift is made by the first sub-transmission 24 and limits the first auxiliary shift operation of the first auxiliary change speed operation lever 49 when the gearshift is made by the second auxiliary change speed mechanism 25.

For example, in this illustrative embodiment, the regulating mechanism 52 includes a protrusion 53 and a long hole 54. The protrusion 53 is provided to any one of the link member 49e and the link member 50e, here the link member 49e. The long hole 54 is provided to the other of the link member 49e and the link member 50e, here the link member 50e. The protrusion 53 is provided to an end portion of the link member 49e, which is opposite to an end portion to which the rod part 49a is connected through another member configuring the link mechanism 49b, on the basis of the rotary shaft 49d. The long hole 54 is provided to an end portion, which is opposite to an end portion to which the rod part 50a is connected through another member configuring the link mechanism 50b, on the basis of the rotary shaft 50d.

The link member 49e and the link member 50e are arranged to have a positional relation that the protrusion 53 is inserted into the long hole 54. The long hole 54 is formed along a rotating trajectory of the protrusion 53 when the link member 49e is rotated about the rotary shaft 49d serving as a rotating center. Also, the long hole 54 is provided with a recess portion 54a in the vicinity of a central part thereof. The recess portion 54a is formed along a rotating trajectory of the link member 50e when the link member 50e is rotated about the rotary shaft 50d serving as a rotating center. At a state where both the first auxiliary shift operation lever 49 and the second auxiliary change speed operation lever 50 are at the neutral positions, the protrusion 53 and the long hole 54 are formed so that the protrusion 53 is opposed to the recess portion 54a while the protrusion 53 is not accommodated in the recess portion 54a, as shown in FIG. 8.

When an operator intends to operate the second auxiliary shift operation lever 50 towards the extreme low speed position from the state where the second auxiliary shift operation lever 50 is at the neutral position and the first auxiliary shift operation lever 49 is at the low speed position or high speed position, i.e., from the state where the gearshift is made by the first auxiliary change speed mechanism 24, the protrusion 53 and an edge portion of the long hole 54 of the regulating mechanism 52 abut on each other. Thereby, the regulating mechanism 52 limits the rotating movement of the link member 50e about the rotary shaft 50d serving as a rotating center, thereby limiting the rotation of the shifter arm 50c and further the moving of the shifter 25e. As a result, the regulating mechanism 52 can limit the second auxiliary shift operation that is made by the second auxiliary shift operation lever 50.

In the meantime, at the state where the first auxiliary shift operation lever 49 is at the neutral position and the second auxiliary shift operation lever 50 is at the extreme low speed position, i.e., at the state where the gearshift is made by the second auxiliary change speed mechanism 25, the protrusion 53 of the regulating mechanism 52 is positioned in the recess portion 54a. When an operator intends to operate the first auxiliary shift operation lever 49 from this state towards the low speed position or high speed position, the protrusion 53 of the regulating mechanism 52 abuts on the edge portion of the long hole 54, here an edge portion of the recess portion 54a. Thereby, the regulating mechanism 52 limits the rotating movement of the link member 49e about the rotary shaft 49d serving as a rotating center, thereby limiting the rotation of the shifter arm 49c and further the moving of the shifter 24e. As a result, the regulating mechanism 52 can limit the first auxiliary shift operation that is made by the first auxiliary shift operation lever 49.

The tractor 1 configured as described above is separately provided with the first auxiliary shift operation lever 49, which performs the first auxiliary shift operation of the first auxiliary change speed mechanism 24 configuring the auxiliary change speed mechanism 18, and the second auxiliary change speed operation lever 50, which performs the second auxiliary shift operation of the second auxiliary change speed mechanism 25 configuring the auxiliary change speed mechanism 18. Thereby, the tractor 1 can be configured so that a further gearshift stage can be easily added to the auxiliary change speed mechanism 18, and is provided with the second auxiliary shift operation lever 50 separately from the first auxiliary shift operation lever 49. Thus, it is possible to easily provide the tractor with a further gearshift stage (for example, extreme low speed stage) at low cost, thereby improving the general versatility. In this case, the tractor 1 has the regulating mechanism 52, so that it can limit the second auxiliary shift operation, which is made by the second auxiliary change speed operation lever 50, from being performed at the state where the gearshift is made by the first auxiliary change speed mechanism 24 and the first auxiliary shift operation, which is made by the first auxiliary change speed operation lever 49, from being performed at the state where the gearshift is made by the second auxiliary change speed mechanism 25. As a result, the tractor 1 can prevent the mechanical lock in the auxiliary change speed mechanism 18.

Also, the tractor 1 is provided with the advancing and reversing switching mechanism 15, the Hi-Lo change speed mechanism 16 and the main change speed mechanism 17 at an upstream side of the auxiliary change speed mechanism 18 as regards the power transmission path, i.e., at the engine 4-side, and the auxiliary change speed mechanism 18 can speed-change the rotating power that is transmitted through the advancing and reversing switching mechanism 15, the Hi-Lo change speed mechanism 16 and the main change speed mechanism 17. As a result, the tractor 1 can configure the power transmission mechanism 13 of the change speed device 5 with a new multistage configuration, thereby improving the general versatility. More specifically, the tractor 1 has the advancing and reversing switching mechanism 15 and the Hi-Lo change speed mechanism 16 that are arranged at the engine 4-side as regards the power transmission path. Thereby, it is possible to arrange the hydraulic multiple disk clutches C1, C2, C3, C4 configuring the advancing and reversing switching mechanism 15 and Hi-Lo change speed mechanism 16 at a more upstream side of the power transmission than the auxiliary change speed mechanism 18 or main change speed mechanism 17. As a result, the tractor 1 can arrange the hydraulic multiple disk clutches C1, C2, C3, C4 at positions of the power transmission path, at which the speed of the rotating power is relatively high and a magnitude of transmission torque is relatively small. Therefore, since the tractor 1 can configure torque capacities of the hydraulic multiple disk clutches C1, C2, C3, C4 to be relatively small, it is possible to miniaturize the apparatus and to reduce the manufacturing cost. Also from this point, the tractor 1 can improve the general versatility. Also, since the Hi-Lo change speed mechanism 16 and the main change speed mechanism 17 can change speed during the traveling, the tractor 1 can select and change one of many gearshift stages depending on circumstances during the traveling, which can also improve the general versatility.

In the meantime, as shown in FIG. 12, the transmission case 12 of this illustrative embodiment is divided into a front transmission case 12F at the front side in the front-rear direction and a rear transmission case 12R at the rear side in the front-rear direction. In this illustrative embodiment, as shown in FIGS. 13 and 14, the front transmission case 12F is provided with a clutch valve 55 for control of the hydraulic multiple disk clutches C1, C2 of the advancing and reversing switching mechanism 15, a clutch valve 56 for control of the hydraulic multiple disk clutches C3, C4 of the Hi-Lo change speed mechanism 16, a clutch valve 57 for control of the hydraulic multiple disk clutch C5 of the PTO clutch mechanism 38, the gear pump 70 and like, which are divided and arranged on left and right surfaces thereof. Here, as shown in FIG. 13, the clutch valve 55 and the clutch valve are arranged on the right surface of the front transmission case 12F in the vehicle width direction. In the meantime, as shown in FIG. 14, the clutch valve 57 and the gear pump 70 are arranged on the left surface of the front transmission case 12F in the vehicle width direction. As a result, the tractor 1 can effectively arrange the clutch valves 55, 56, 57, the gear pump 70 and the like on an outer surface of the front transmission case 12F. In the meantime, a clutch valve (not shown) for control of hydraulic multiple disk clutches C6, C7 (refer to FIG. 23), which will be described in a modified embodiment, may be provided on the right surface of the front transmission case 12F in the vehicle width direction. However, the invention is not limited thereto.

Also, as shown in FIG. 15, the change speed device 5 of this illustrative embodiment is configured so that the 2WD/4WD switching mechanism 19 and the PTO driving mechanism 20 are arranged at opposing positions on the basis of a central line in the vehicle width direction in the front transmission case 12F. Here, the change speed device 5 is configured so that the 2WD/4WD switching mechanism 19 is arranged at the right side in the vehicle width direction and the PTO driving mechanism 20 is arranged at the left side in the vehicle width direction. As a result, the change speed device 5 can effectively arrange the 2WD/4WD switching mechanism 19 and the PTO driving mechanism 20 and suppress a height in the vertical direction. For example, the change speed device 5 can suppress a downward protruding in the vertical direction, thereby making a vehicle height relatively high.

Also, in this illustrative embodiment, the main shift operation lever 45 switches the main change speed mechanism 17 to any one of the first speed gear stage 17a to the sixth speed gear stage 17f or to the neutral state depending on the main shift operation of an operator. As shown in FIG. 16, the main shift operation lever 45 is operated in the direction of the main shift operation, here the vehicle width direction and in the front-rear direction, so that it can be operated to a first speed gearshift position corresponding to the first speed gear stage 17a, a second speed gearshift position corresponding to the second speed gear stage 17b, a third speed gearshift position corresponding to the third speed gear stage 17c, a fourth speed gearshift position corresponding to the fourth speed gear stage 17d, a fifth speed gearshift position corresponding to the fifth speed gear stage 17e and a sixth speed gearshift position corresponding to the sixth speed gear stage 17f on the basis of the neutral position.

As shown in FIGS. 17, 18 and 19, the main shift operation lever 45 moves any one of the three shifter stays 58, 59, 60 to thus move the shifters 61, 62, 63, which are respectively provided to the shifter stays 58, 59, 60, to predetermined positions relating to the first speed gear stage 17a to the sixth speed gear stage 17f in accordance with the main shift operation. Thereby, the main shift operation lever 45 realizes 6 (=2×3) positions by one lever, so that it can switch the main change speed mechanism 17 to any one of the first speed gear stage 17a to the sixth speed gear stage 17f or to the neutral state.

The respective shifter stays 58, 59, 60 are provided to move in the front-rear direction. When seen from a section taken along the vehicle width direction (refer to FIG. 18), the shifter stays 58, 59, 60 are arranged so that the shifter stays 58, 60 face each other at the left and right sides in the vehicle width direction, on the basis of the shifter stay 59. Here, the shifter stay 58 is positioned at the right-upper side in the vehicle width direction as regards the shifter stay 59 and the shifter stay 60 is positioned at the left-upper side in the vehicle width direction as regards the shifter stay 59. The shifter stay 58 and the shifter stay 60 are arranged so that they partially overlap with the shifter stay 59 in the vertical direction. Also, the shifter stay 58 is arranged so that it partially overlaps with the shifter stay 59 in the vehicle width direction. Likewise, the shifter stay 60 is arranged so that it partially overlaps with the shifter stay 59 in the vehicle width direction. Thereby, the main change speed mechanism 17 can be configured to be more compact, which also improves the general versatility of the tractor 1.

The shifter 61 is fixed to the shifter stay 58. The shifter 61 is to switch the coupling state of the first speed gear stage 17a and the second speed gear stage 17b with the gearshift shaft 22 and is arranged between the first speed gear stage 17a and the second speed gear stage 17b in the front-rear direction. As the shifter stay 58 is moved in the front-rear direction, the shifter 61 can be moved to a first speed-side position at which the first speed gear stage 17a and the gearshift shaft 22 are integrally rotatably coupled, a second speed-side position at which the second speed gear stage 17b and the gearshift shaft 22 are integrally rotatably coupled and a neutral position at which both the first speed gear stage 17a and the second speed gear stage 17b are released without being coupled with the gearshift shaft 22. The shifter 62 is fixed to the shifter stay 59. The shifter 62 is to switch the coupling state of the third speed gear stage 17c and the fourth speed gear stage 17d with the gearshift shaft 22 and is arranged between the third speed gear stage 17c and the fourth speed gear stage 17d in the front-rear direction. As the shifter stay 59 is moved in the front-rear direction, the shifter 62 can be moved to a third speed-side position at which the third speed gear stage 17c and the gearshift shaft 22 are integrally rotatably coupled, a fourth speed-side position at which the fourth speed gear stage 17d and the gearshift shaft 22 are integrally rotatably coupled and a neutral position at which both the third speed gear stage 17c and the fourth speed gear stage 17d are released without being coupled with the gearshift shaft 22. The shifter 63 is fixed to the shifter stay 60. The shifter 63 is to switch the coupling state of the fifth speed gear stage 17e and the sixth speed gear stage 17f with the gearshift shaft 22 and is arranged between the fifth speed gear stage 17e and the sixth speed gear stage 17f in the front-rear direction. As the shifter stay 60 is moved in the front-rear direction, the shifter 63 can be moved to a fifth speed-side position at which the fifth speed gear stage 17e and the gearshift shaft 22 are integrally rotatably coupled, a sixth speed-side position at which the sixth speed gear stage 17f and the gearshift shaft 22 are integrally rotatably coupled and a neutral position at which both the fifth speed gear stage 17e and the sixth speed gear stage 17f are released without being coupled with the gearshift shaft 22.

The main shift operation lever 45 is connected with the shifter arm 45c through a rod part 45a, a link mechanism 45b and the like. At the state where the main shift operation lever 45 is located at the neutral position (a central position in FIG. 16), the shifter arm 45c is engaged with an engaging recess 59b (refer to FIG. 19) of a boss part 59a (refer to FIG. 19) of the shifter stay 59. When the main shift operation lever 45 falls down leftwards in the vehicle width direction from the neutral position state, the shifter arm 45*c* is engaged with an engaging recess 58*b* (refer to FIG. 19) of a boss part 58*a* (refer to FIG. 19) of the shifter stay 58. In the meantime, when the main shift operation lever 45 falls down rightwards in the vehicle width direction from the neutral position state, the shifter arm 45*c* is engaged with an engaging recess 60*a* (refer to FIG. 19) of the shifter stay 60.

At the state where the main shift operation lever 45 falls down leftwards in the vehicle width direction from the neutral position state and the shifter arm 45*c* is thus engaged with the engaging recess 58*b*, when the main shift operation lever 45 falls down further forwards in the front-rear direction, it is moved to the first speed gearshift position, so that it can move the shifter 61 to the first speed-side position together with the shifter stay 58. Thereby, the main shift operation lever 45 can switch the gearshift stage of the main change speed mechanism 17 to the first speed gear stage 17*a*. Also, at the state where the main shift operation lever 45 falls down leftwards in the vehicle width direction from the neutral position state and the shifter arm 45*c* is thus engaged with the engaging recess 58*b*, when the main shift operation lever 45 falls down further rearwards in the front-rear direction, it is moved to the second speed gearshift position, so that it can move the shifter 61 to the second speed-side position together with the shifter stay 58. Thereby, the main shift operation lever 45 can switch the gearshift stage of the main change speed mechanism 17 to the second speed gear stage 17*a*. Also, when the main shift operation lever 45 falls down forwards in the front-rear direction from the neutral position state (the state where the shifter arm 45*c* is engaged with the engaging recess 59*b*), it is moved to the third speed gearshift position, so that it can move the shifter 62 to the third speed-side position together with the shifter stay 59. Thereby, the main shift operation lever 45 can switch the gearshift stage of the main change speed mechanism 17 to the third speed gear stage 17*c*. Also, when the main shift operation lever 45 falls down rearwards in the front-rear direction from the neutral position state, it is moved to the fourth speed gearshift position, so that it can move the shifter 62 to the fourth speed-side position together with the shifter stay 59. Thereby, the main shift operation lever 45 can switch the gearshift stage of the main change speed mechanism 17 to the fourth speed gear stage 17*d*. Also, at the state where the main shift operation lever 45 falls down rightwards in the vehicle width direction from the neutral position state and the shifter arm 45*c* is thus engaged with the engaging recess 60*a*, when the main shift operation lever 45 falls down further forwards in the front-rear direction, it is moved to the fifth speed gearshift position, so that it can move the shifter 63 to the fifth speed-side position together with the shifter stay 60. Thereby, the main shift operation lever 45 can switch the gearshift stage of the main change speed mechanism 17 to the fifth speed gear stage 17*e*. Also, at the state where the main shift operation lever 45 falls down rightwards in the vehicle width direction from the neutral position state and the shifter arm 45*c* is thus engaged with the engaging recess 60*a*, when the main shift operation lever 45 falls down further rearwards in the front-rear direction, it is moved to the sixth speed gearshift position, so that it can move the shifter 63 to the sixth speed-side position together with the shifter stay 60. Thereby, the main shift operation lever 45 can switch the gearshift stage of the main change speed mechanism 17 to the sixth speed gear stage 17*f*. Like this, the main shift operation lever 45 can switch the main change speed mechanism 17 to any one of the first speed gear stage 17*a* to the sixth speed gear stage 17*f* or to the neutral state, depending on the main shift operation of an operator.

Also, the engaging recess 60*a* is directly formed at the shifter stay 60. In the meantime, the engaging recesses 58*a*, 58*b* are formed at the boss parts 58*a*, 59*a* that are formed separately from the bodies of the shifter stays 58, 59, and the boss parts 58*a*, 59*a* are respectively bolt-engaged and mounted to the bodies of the shifter stays 58, 59. Thereby, the main change speed mechanism 17 can improve the mounting abilities of the shifter stays 58, 59, 60, the engaging recesses 58*b*, 59*b*, 60*a* and the shifter arm 45*c*. As a result, it is possible to improve the productivity, which also improves the general versatility of the tractor 1.

The tractor 1 of this illustrative embodiment described above has the auxiliary change speed mechanism 18 including the first auxiliary change speed mechanism 24 that can speed-change the rotating power, which is transmitted from the engine 4 and is speed-changed in the main change speed mechanism 17, and then transmit the same to the rear wheels 3 and the second auxiliary change speed mechanism 25 that can speed-change the rotating power, which is speed-changed in the main change speed mechanism 17, to the lower speed than in the first auxiliary change speed mechanism 24 and then transmit the same to the drive wheels, the first auxiliary shift operation lever 49 that performs the first auxiliary shift operation of the first auxiliary change speed mechanism 24 and the second auxiliary shift operation lever 50 that is separately provided from the first auxiliary shift operation lever 49 and performs the second auxiliary shift operation of the second auxiliary change speed mechanism 25. Therefore, the tractor 1 can be configured so that a further gearshift stage can be easily added to the auxiliary change speed mechanism 18, and is easily provided with the further gearshift stage, which improves the general versatility.

In the meantime, the working vehicle of the above illustrative embodiment of the invention is not limited to the above illustrative embodiment and can be variously changed without departing from the scope of the invention.

Figure 20:
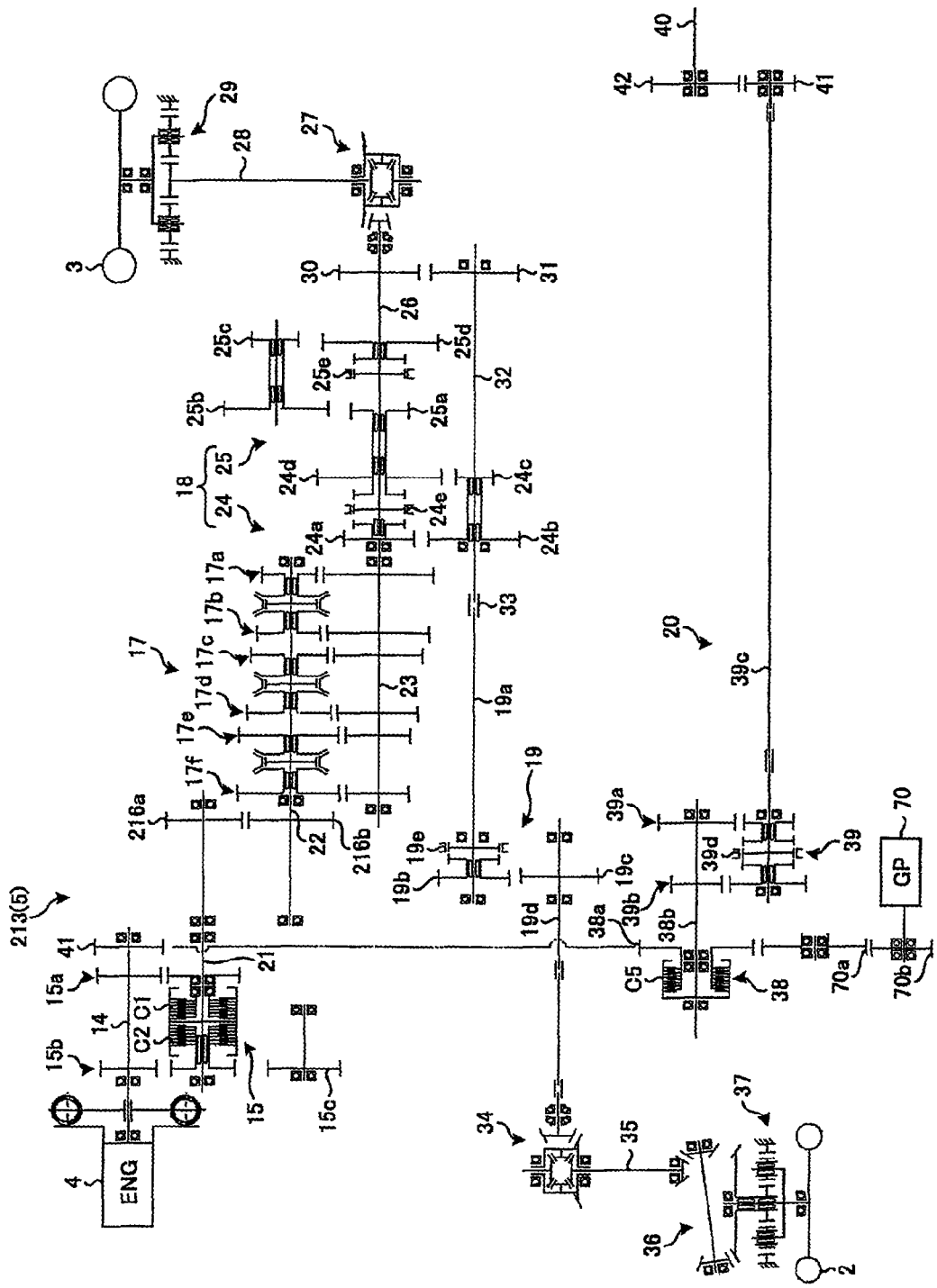
FIG. 20 is a schematic view showing a power transmission mechanism of a change speed device of a tractor according to a modified embodiment.
Figure 21:
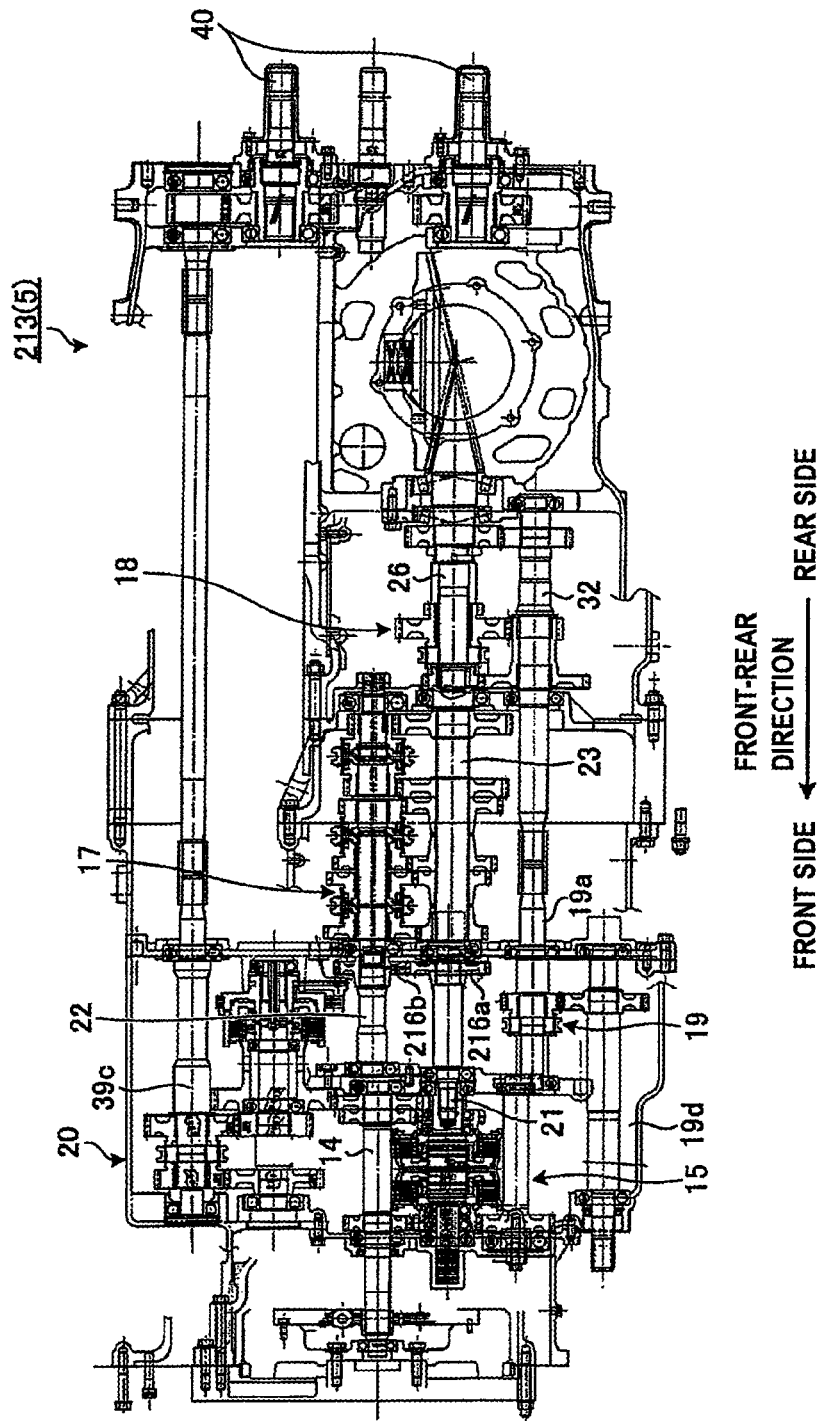
FIG. 21 is a schematic view showing the power transmission mechanism of the change speed device of the tractor according to the modified embodiment.

For example, a power transmission mechanism 213 of the change speed device 5 according to a modified embodiment shown in FIGS. 20 and 21 is not provided with the Hi-Lo change speed mechanism 16 (refer to FIG. 5 and the like) serving as the high-low change speed mechanism. The power transmission mechanism 213 is configured so that a gear 216*a*, which is integrally rotatably coupled with the counter shaft 21, and a gear 216*b*, which is integrally rotatably coupled with the gearshift shaft 22, are meshed with each other. In this case, the rotating power transmitted to the counter shaft 21 is transmitted to the gearshift shaft 22 through the gear 216*a* and the gear 216*b*.

Figure 22:
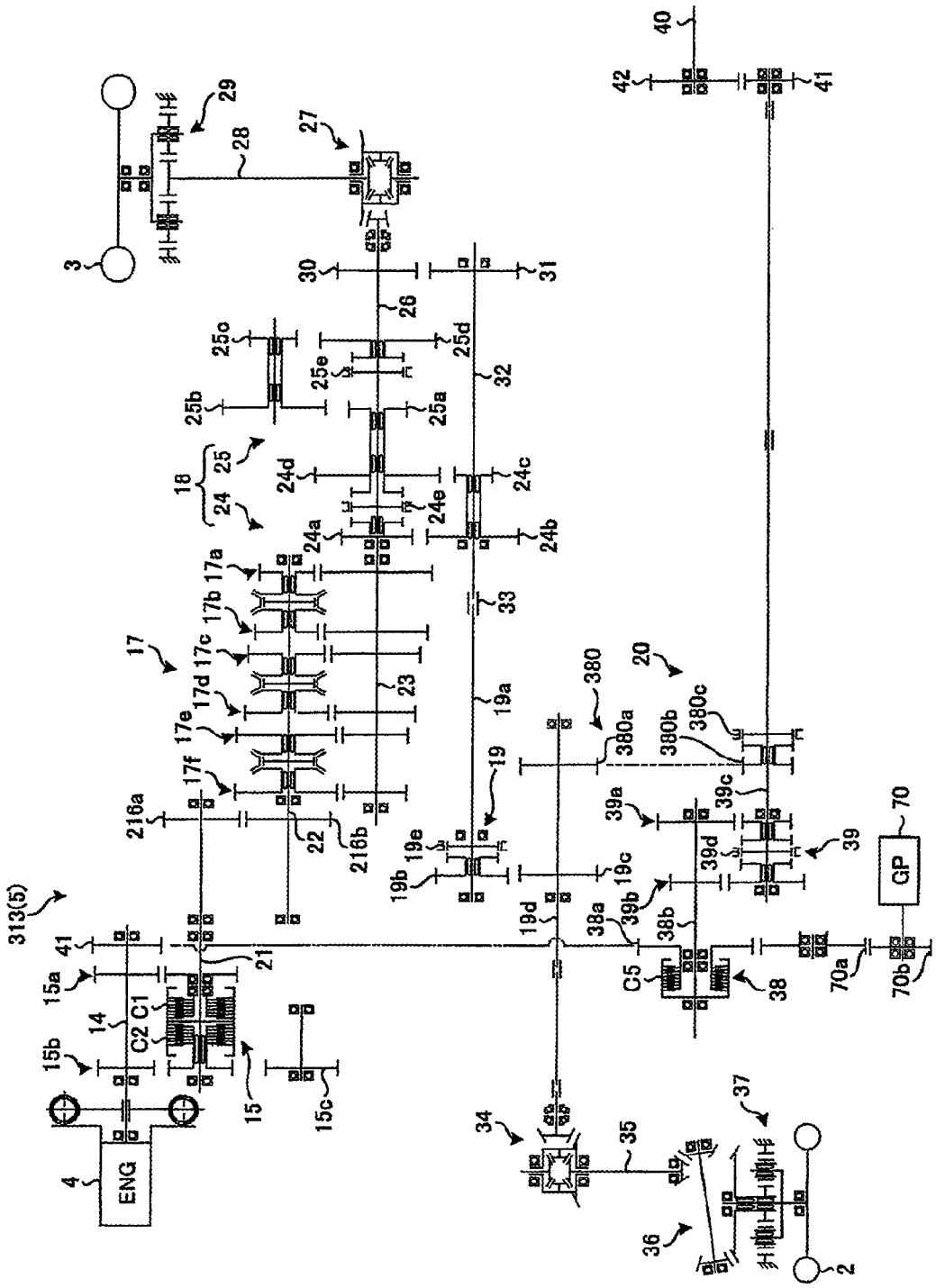
FIG. 22 is a schematic view showing a power transmission mechanism of a change speed device of a tractor according to a modified embodiment.

Also, a power transmission mechanism 313 of the change speed device 5 according to a modified embodiment shown in FIG. 22 is not provided with the Hi-Lo change speed mechanism 16 (refer to FIG. 5 and the like) serving as the high-low change speed mechanism and the PTO driving mechanism 20 includes a PTO vehicle speed interlocking mechanism 380, separately from the PTO change speed mechanism 39. The PTO vehicle speed interlocking mechanism 380 is a mechanism for rotating the PTO shaft 40 at speed interlocking with a vehicle speed. The PTO vehicle speed interlocking mechanism 380 includes a first gear 380*a*, a second gear 380*b* and a shifter 380*c*. The first gear 380*a* is integrally rotatably coupled with the transmission shaft 19*d* of the 2WD/4WD switching mechanism 19. The second gear 380*b* is meshed with the first gear 380*a*. The shifter 380*c* is to switch the coupling state of the second gear 380*b* with the transmission shaft 39*c*. The shifter 380*c* can be moved to a neutral position at which the second gear 380*b* and the transmission shaft 39*c* are released without being coupled with each other.

At the state where the PTO change speed mechanism 39 is at the neutral state, when the shifter 380c is located at a vehicle speed interlocking-side position, the PTO vehicle speed interlocking mechanism 380 transmits the rotating power transmitted to the transmission shaft 19d from the first gear 380a to the transmission shaft 39c through the second gear 380b. Thereby, the PTO vehicle speed interlocking mechanism 380 can transmit the rotating power from the engine 4 to the PTO shaft 40, as rotating power interlocking with the vehicle speed, through the advancing and reversing switching mechanism 15, the main change speed mechanism 17, the auxiliary change speed mechanism 18, the 2WD/4WD switching mechanism 19 and the like, thereby driving the implement.

Also, when the shifter 380c is at the neutral position, the PTO vehicle speed interlocking mechanism 380 is at a state where the second gear 380b runs idle relative to the transmission shaft 39c, i.e., at a neutral state. When the PTO change speed mechanism 39 is at the Hi (high speed)-side or Lo (low speed)-side position, the PTO vehicle speed interlocking mechanism 380 is at the neutral state. For example, when an operator operates a PTO vehicle speed interlocking switching lever, the position of the shifter 380c is switched, so that the PTO vehicle speed interlocking mechanism 380 can switch the vehicle speed interlocking-side and the neutral state.

Figure 23:
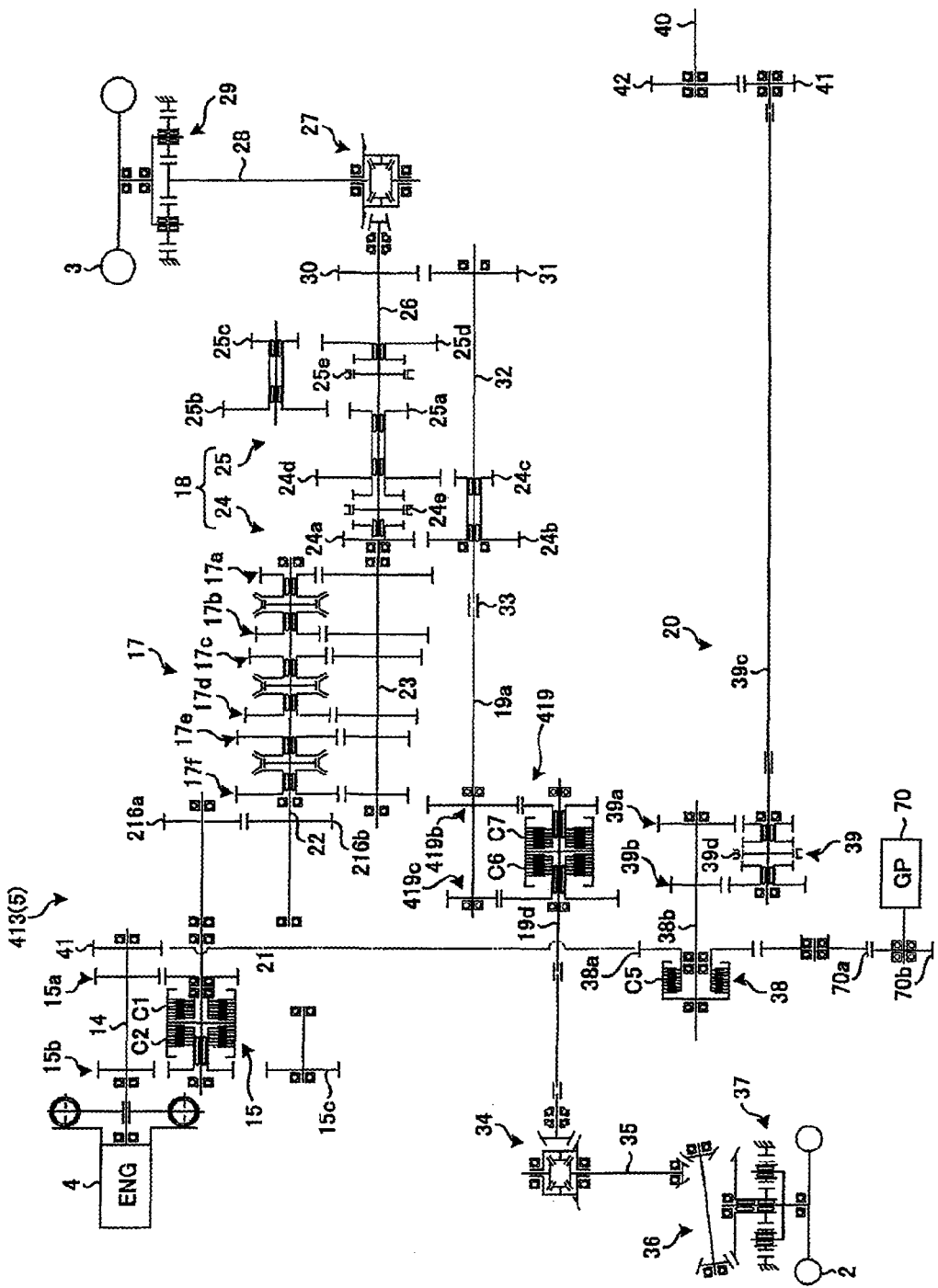
FIG. 23 is a schematic view showing a power transmission mechanism of a change speed device of a tractor according to a modified embodiment.
Figure 24:
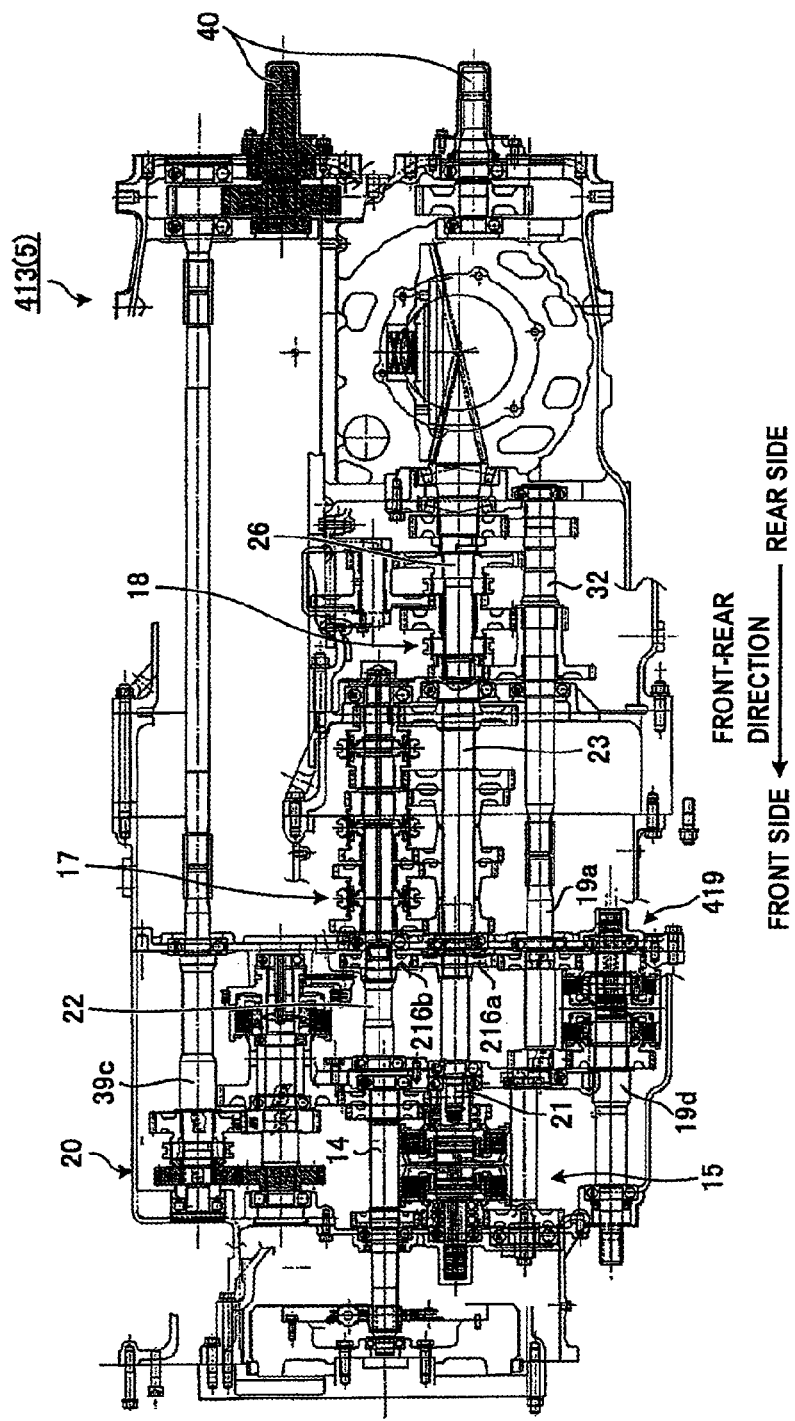
FIG. 24 is a schematic view showing the power transmission mechanism of the change speed device of the tractor according to the modified embodiment.

Also, a power transmission mechanism 413 of the change speed device 5 according to a modified embodiment shown in FIGS. 23 and 24 is not provided with the Hi-Lo change speed mechanism 16 (refer to FIG. 5 and the like) serving as the high-low change speed mechanism and a 2WD/4WD switching mechanism 419 includes the hydraulic multiple disk clutches C6, C7 and also serves as a front-wheel speed increasing mechanism. The 2WD/4WD switching mechanism 419 includes the transmission shaft 19a, a Hi (high speed)-side gear stage 419b, a Lo (low speed)-side gear stage 419c, the hydraulic multiple disk clutch (Lo (low speed)-side clutch) C6, the hydraulic multiple disk clutch (Hi (high speed)-side clutch) C7 and the transmission shaft 19d. The hydraulic multiple disk clutches C6, C7 can switch the power transmission path in the 2WD/4WD switching mechanism 419 by switching the engaged/release state. The 2WD/4WD switching mechanism 419 changes the transmission path of the rotating power transmitted to the transmission shaft 19a and transmits the same to the transmission shaft 19d in accordance with the engaged/release states of the hydraulic multiple disk clutches C6, C7. When the hydraulic multiple disk clutch C6 is at the engaged state and the hydraulic multiple disk clutch C7 is at the release state, the 2WD/4WD switching mechanism 419 speed-changes the rotating power, which is transmitted to the transmission shaft 19a, through the Lo-side gear state 419c and the hydraulic multiple disk clutch C6 and then transmits the same to the transmission shaft 19d. Thereby, the 2WD/4WD switching mechanism 419 can speed-change the rotating power from the engine 4 with a change gear ratio of the Hi-side gear stage 419b or Lo-side gear stage 419c and then transmit the same to the rear stage. In this case, the 2WD/4WD switching mechanism 419 can speed-change the rotating power from the engine 4 with the change gear ratio of the Hi-side gear stage 419b, relatively increase and transmit the same to the rear stage, as required, upon turning of the tractor 1, for example, thereby increasing the rotating speed of the front wheels 2 and reducing a turning radius of the tractor 1. Also, when both the hydraulic multiple disk clutches C6, C7 become at the release state, the 2WD/4WD switching mechanism 419 interrupts the rotating power transmitted to the transmission shaft 19a from being power-transmitted to the transmission shaft 19d. As a result, the tractor 1 can travel with the two-wheel driving. In the meantime, the 2WD/4WD switching mechanism 419 may not be provided with the Hi-side gear stage 419b, the hydraulic multiple disk clutch C7 and the like and may not have the function of the front-wheel speed increasing mechanism.

What is claimed is:

1. A working vehicle comprising:
 a main change speed mechanism configured to transmit a rotating power, generated by a power source;
 a first auxiliary change speed mechanism configured to transmit the rotating power, transmitted through the main change speed mechanism, to drive wheels;
 a second auxiliary change speed mechanism configured to transmit the rotating power, transmitted through the main change speed mechanism, to the drive wheels;
 a first lever configured to operate the first auxiliary change speed mechanism to perform a first auxiliary shift operation, the first lever being configured to be operated by an operator; and
 a second lever configured to operate the second auxiliary change speed mechanism to perform a second auxiliary shift operation, the second lever being configured to be operated by an operator; and
 a regulating mechanism configured to:
  limit the second auxiliary shift operation to maintain the neutral state of the second auxiliary change speed mechanism when the rotating power is transmitted by the first auxiliary change speed mechanism; and
  limit the first auxiliary shift operation to maintain the neutral state of the first auxiliary change speed mechanism when the rotating power is transmitted by the second auxiliary change speed mechanism, wherein:
 the first auxiliary change speed mechanism is activated when the second auxiliary change speed mechanism in a neutral state; and
 the second auxiliary change speed mechanism is activated when the first auxiliary change speed mechanism is in the neutral state.

2. The working vehicle according to claim 1, wherein:
 the first auxiliary change speed mechanism includes a first shifter configured to change a rotating speed to a high speed or a low speed;
 the second auxiliary change speed mechanism includes a second shifter configured to change the rotating speed to an extreme low speed; and
 the first shifter and the second shifter are supported by a gearshift shaft.

3. The working vehicle according to claim 2, further comprising:
 a transmission shaft configured to:
 transmit the rotating power when the rotating speed is changed to the low speed in the first auxiliary change speed mechanism; and
  transmit the rotating power from the main change speed mechanism to the second auxiliary change speed mechanism.

4. The working vehicle according to claim 1, wherein the second auxiliary change speed mechanism and the second lever are detachably attached to the working vehicle.

5. The working vehicle according to claim 1, further comprising
 a regulating mechanism configured to:
  limit the second auxiliary shift operation when the rotating speed is changed by the first auxiliary change speed mechanism; and limit the first auxiliary shift operation when the rotating speed is changed by the second auxiliary change speed mechanism.

6. The working vehicle according to claim 5, further comprising:
a switching mechanism configured to switch a rotation corresponding to a generated power, generated by the power source, to rotation in advancing direction or reversing direction; and
a high-low change speed mechanism configured to change a rotating speed at a high speed stage or a low speed stage, wherein:
the main change speed mechanism is configured to change the rotating speed at any one of a plurality of gearshift stages; and
the first auxiliary change speed mechanism and the second auxiliary speed change mechanism are configured to change the rotating speed corresponding to the rotating power that is transmitted through the switching mechanism, the high-low change speed mechanism and the main change speed mechanism.

7. The working vehicle according to claim 6, wherein:
each of the switching mechanism and the high-low change speed mechanism includes a hydraulic multiple disk clutch that is configured to switch a power transmission path; and
the main change speed mechanism is a synchromesh change speed mechanism and is configured to change the rotating speed corresponding to the rotating power that is transmitted through the switching mechanism and the high-low change speed mechanism.

8. The working vehicle according to claim 7, further comprising:
a high-low switch configured to operate a high-low gearshift operation of the high-low change speed mechanism while the working vehicle is moving; and
a main lever configured to operate a main shift operation of the main change speed mechanism while the working vehicle is moving.

* * * * *